(12) United States Patent
Kerr et al.

(10) Patent No.: US 9,534,510 B2
(45) Date of Patent: Jan. 3, 2017

(54) SYSTEM AND METHOD FOR THERMAL CHEMICAL CONVERSION OF WASTE

(75) Inventors: Donald F. Kerr, Meridian, ID (US); Jonathan D. Kerr, Boise, ID (US); Roger L. Kolb, Meridian, ID (US); C. Lloyd Mahaffey, Jr., Eagle, ID (US)

(73) Assignee: DYNAMIS ENERGY, LLC, Eagle, ID (US)

(*) Notice: Subject to any disclaimer, the term of this patent is extended or adjusted under 35 U.S.C. 154(b) by 651 days.

(21) Appl. No.: 13/161,257

(22) Filed: Jun. 15, 2011

(65) Prior Publication Data

US 2012/0227680 A1    Sep. 13, 2012

Related U.S. Application Data

(60) Provisional application No. 61/449,943, filed on Mar. 7, 2011.

(51) Int. Cl.
*F23G 5/40* (2006.01)
*F01K 13/00* (2006.01)
(Continued)

(52) U.S. Cl.
CPC .............. *F01K 13/00* (2013.01); *F01K 25/10* (2013.01); *F23G 5/0276* (2013.01); *F23G 5/16* (2013.01);
(Continued)

(58) Field of Classification Search
CPC .............. F23G 5/00; F23G 5/38; F23G 5/40; F23G 5/50; F23G 5/44; F23G 7/00; F23G 2203/70; F23G 2206/00; F23G 2206/20; F23G 2206/203; F23G 2900/50001; F23G 2900/50401; F23G 5/16; F23G 5/165; F01K 13/00; F01K 3/00
(Continued)

(56) References Cited

U.S. PATENT DOCUMENTS 1,712,128 A * 5/1929 Guido .............................. 431/90
2,442,686 A * 6/1948 Guerchoux ..................... 114/26
(Continued)

FOREIGN PATENT DOCUMENTS

GB           193499   * 11/1921
WO       2008153607     12/2008

OTHER PUBLICATIONS

Patent Cooperation Treaty; International Search Report and Written Opinion for PCT/US2012/027918 dated Aug. 9, 2012.
(Continued)

*Primary Examiner* — Steven B McAllister
*Assistant Examiner* — Ko-Wei Lin
(74) *Attorney, Agent, or Firm* — Parsons Behle & Latimer

(57) ABSTRACT

A waste-to-energy conversion apparatus comprising a primary combustion chamber capable of holding a load of waste, and the primary combustion chamber further comprises a heat source to heat the waste and generate a syn gas stream, grates, within the primary chamber, capable of supporting the load of waste during heating, a mixing chamber wherein the syn gas is mixed with additional combustion gas, a multi-chambered secondary combustion chamber for combusting the mixture of syn gas and additional combustion gas, and an energy extraction system for extracting the heat energy generated by the combustion of the mixture of syn gas and additional combustion gas.

41 Claims, 18 Drawing Sheets

(51) Int. Cl.
*F01K 25/10* (2006.01)
*F23G 5/16* (2006.01)
*F23G 5/46* (2006.01)
*F23G 5/027* (2006.01)
*F23G 5/50* (2006.01)

(52) U.S. Cl.
CPC . *F23G 5/46* (2013.01); *F23G 5/50* (2013.01); *F23G 2201/303* (2013.01); *F23G 2201/701* (2013.01); *F23G 2203/107* (2013.01); *F23G 2203/20* (2013.01); *F23G 2203/30* (2013.01); *F23G 2203/601* (2013.01); *F23G 2205/122* (2013.01); *F23G 2206/203* (2013.01); *F23G 2207/20* (2013.01); *F23G 2207/30* (2013.01); *F23G 2900/55006* (2013.01); *F23G 2900/55008* (2013.01); *Y02E 20/12* (2013.01)

(58) Field of Classification Search
USPC ... 126/85 R; 110/235–259; 432/48; 431/157, 431/159
See application file for complete search history.

(56) References Cited

U.S. PATENT DOCUMENTS

| | | | |
|---|---|---|---|
| 4,270,898 A * | 6/1981 | Kelly | 432/19 |
| 4,376,373 A | 3/1983 | Weber et al. | |
| 4,941,415 A * | 7/1990 | Pope et al. | 110/235 |
| 5,127,344 A * | 7/1992 | Katsui | 110/255 |
| 5,158,025 A | 10/1992 | Johnson | |
| 5,545,031 A * | 8/1996 | Joshi et al. | 431/8 |
| 5,605,104 A * | 2/1997 | Gross et al. | 110/346 |
| 5,967,063 A * | 10/1999 | Wu | 110/240 |
| 6,376,763 B2 * | 4/2002 | Funahashi et al. | 136/201 |
| 6,439,135 B1 * | 8/2002 | Pope | 110/233 |
| 8,007,688 B2 * | 8/2011 | Dahlin et al. | 252/373 |
| 2001/0003038 A1 * | 6/2001 | Rasmussen | 431/202 |
| 2005/0039638 A1 | 2/2005 | Leung et al. | |
| 2009/0020052 A1 | 1/2009 | Becchetti et al. | |
| 2009/0200180 A1 | 8/2009 | Capote et al. | |
| 2010/0199895 A1 | 8/2010 | Einarsson | |
| 2011/0036280 A1 | 2/2011 | Toase et al. | |
| 2011/0056416 A1 * | 3/2011 | Widmer | F22B 35/00 110/185 |

OTHER PUBLICATIONS

Extended European Search Report dated Jul. 28, 2014 issued in European Patent Application No. 12755412.9 Jul. 28, 2014.
Chinese Intellectual Property Office; Office Action for Application No. 201280022130.4 dated Mar. 9, 2015.
The State Intellectual Property Office of China; Office Action for Chinese Patent Application No. 201280022130.4 dated Nov. 3, 2015

* cited by examiner

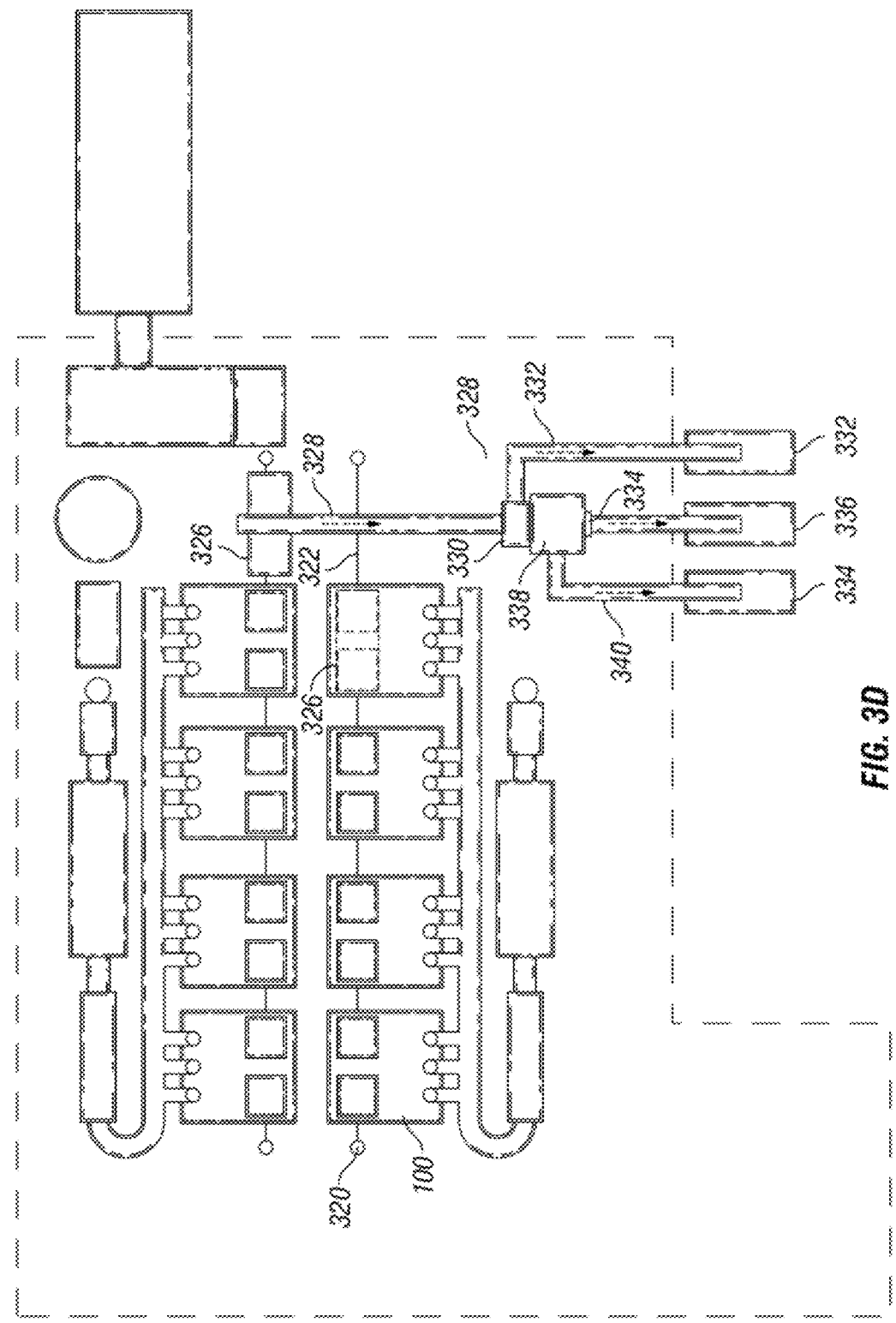

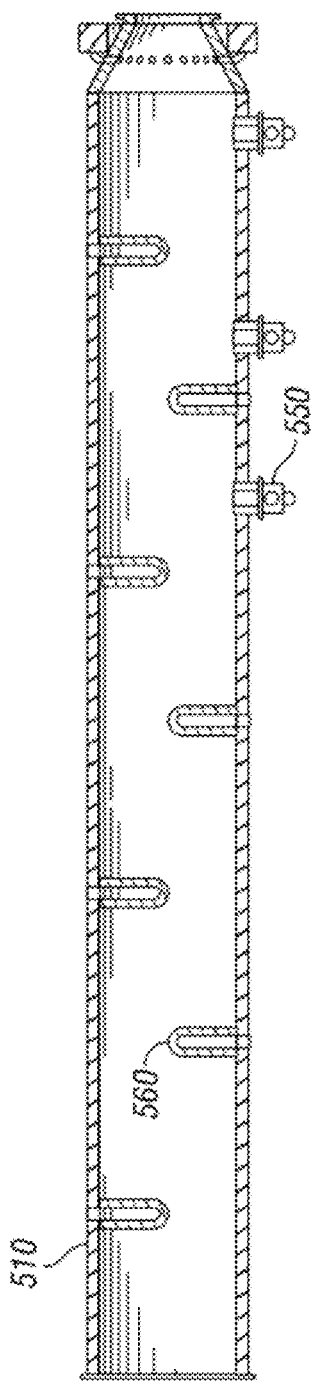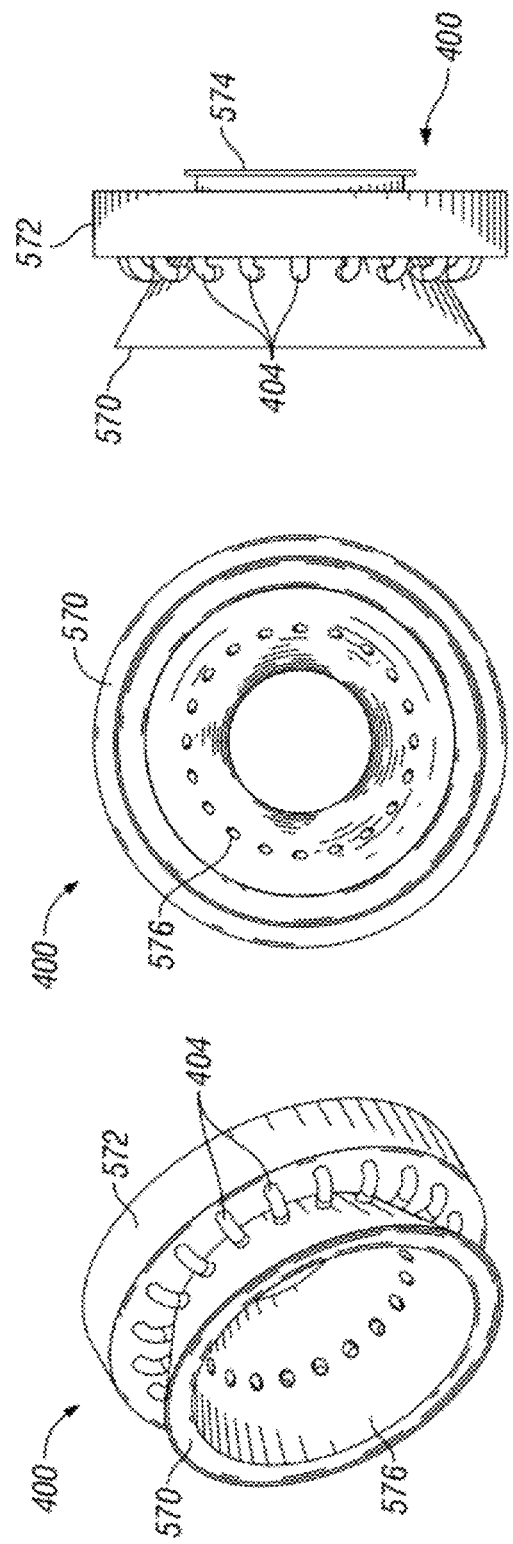
FIG. 5F
FIG. 5G
FIG. 5H
FIG. 5I

| SUMMER | 1 | 2 | 3 | 4 | 5 | 6 | 7 | 8 | 9 | 10 | 11 | 12 | 13 | 14 | 15 | OUTPUT REQUIRED |
|---|---|---|---|---|---|---|---|---|---|---|---|---|---|---|---|---|
| 1 | 3.7 | | | | | | | | | | | | | | | 0 |
| 2 | 3.7 | | | | | | | | | | | | | | | 3.7 |
| 3 | 3.7 | | | | | | | | | | | | | | | 3.7 |
| 4 | 3.7 | | | | | | | | | | | | | | | 3.7 |
| 5 | 3.7 | | | | | | | | | | | | | | | 3.7 |
| 6 | 3.7 | 3.7 | 3.7 | 3.7 | | | | | | | | | | | | 3.7 |
| 7 | | 3.7 | 3.7 | 3.7 | | | | | | | | | | | | 14.8 |
| 8 | | 3.7 | 3.7 | 3.7 | 3.7 | | 3.7 | 3.7 | | | | | | | | 14.8 |
| 9 | | 3.7 | 3.7 | 3.7 | 3.7 | | 3.7 | 3.7 | 3.7 | | | | | | | 14.8 |
| 10 | | 3.7 | 3.7 | 3.7 | 3.7 | | 3.7 | 3.7 | 3.7 | 3.7 | | | | | | 14.8 |
| 11 | | 3.7 | 3.7 | 3.7 | 3.7 | | 3.7 | 3.7 | 3.7 | 3.7 | | | | | | 14.8 |
| 12 | | | | | | 3.7 | 3.7 | 3.7 | 3.7 | 3.7 | | | | | | 14.8 |
| 13 | | | | | | 3.7 | 3.7 | 3.7 | 3.7 | 3.7 | | | | | | 14.8 |
| 14 | | | | | | 3.7 | 3.7 | 3.7 | 3.7 | 3.7 | 3.7 | | | | | 14.8 |
| 15 | | | | | | 3.7 | 3.7 | 3.7 | 3.7 | 3.7 | 3.7 | | | | | 18.5 |
| 16 | | | | | | 3.7 | | | | 3.7 | 3.7 | | | | | 18.5 |
| 17 | | | | | | | | | | 3.7 | 3.7 | 3.7 | 3.7 | 3.7 | | 22.2 |
| 18 | | | | | | | | | | 3.7 | 3.7 | 3.7 | 3.7 | 3.7 | 3.7 | 21.875 |
| 19 | | | | | | | | | | 3.7 | 3.7 | 3.7 | 3.7 | 3.7 | 3.7 | 21.875 |
| 20 | | | | | | | | | | 3.7 | 3.7 | 3.7 | 3.7 | 3.7 | 3.7 | 21.875 |
| 21 | | | | | | | | | | | 3.7 | 3.7 | 3.7 | 3.7 | 3.7 | 21.875 |
| 22 | | | | | | | | | | | | 3.7 | 3.7 | 3.7 | 3.7 | 18.5 |
| 23 | | | | | | | | | | | | | | 3.7 | 3.7 | 18.5 |
| 24 | | | | | | | | | | | | | | | 3.7 | 14 |

FIG. 9A

SYSTEM AND METHOD FOR THERMAL CHEMICAL CONVERSION OF WASTE

CROSS REFERENCE TO RELATED APPLICATIONS

This application claims priority under 35 USC §119 to U.S. Provisional Patent Ser. No. 61/449,943, filed on Mar. 7, 2011, and titled "Microcontroller-Based Remote Monitoring And Control Unit," the entire contents of which are hereby incorporated by reference.

BACKGROUND

1. Technical Field

The present disclosure relates generally to apparatus and methods for thermally and chemically converting waste products, such as municipal waste, into an ignitable gas stream. More particularly, the disclosure relates to improved modular apparatus for the controlled gasification and thermal conversion of waste products into a combustible gas, and for using the combustible gas a fuel source to produce electricity, or other useful energy.

2. Background

Waste converting thermal oxidation systems are known. For example, U.S. Pat. No. 4,941,415, which is hereby incorporated by reference, discloses an example of such a system. In general, municipal waste, or waste collected from residential, commercial, and some industrial and government facilities, is appropriately sorted, dried, and then loaded into a primary combustion chamber. The primary combustion chamber is typically sealed, and the waste ignited, to create a stream of combustible gas in the air-deprived environment of the primary combustion chamber. The combustible gas is typically mixed with additional combustible gas and channeled to a secondary combustion chamber where it is burned to generate thermal energy.

It is also known to arrange a plurality of primary chambers and combine the combustible gas effluent output into a single secondary combustion chamber. For example, U.S. Pat. No. 6,439,135, which is hereby incorporated by reference, discloses one such arrangement.

However, existing systems suffer from many drawbacks that make their operation inefficient, expensive, and potentially harmful to the environment. For example, existing systems often require pre-treatment of waste, such as sorting and drying, which require additional labor, operator attention, and costs. Other systems require significant amounts of fuel to ignite the waste and begin and sustain combustion. Another drawback of existing systems is the loss of heat and thermal energy that lowers the efficiency and output of the waste-to-energy conversion. Further, existing systems that do not operate in optimal ranges may exhibit emissions problems such as particulates, NOx, many toxic volatile metals, and dioxins/furans.

Existing systems also lack the control parameters for monitoring and controlling the production from gasification chambers, the modeling of said production of gases necessary for coordination to energy extraction, for venting the exhaust to atmosphere, or for energy generation, or the emissions discharged to the atmosphere. Many existing systems lack the ability to provide the foundation for scalability of the waste-to-energy conversion process. Finally, existing systems lack the ability to provide guaranteed energy generation when deficiencies of operation occur.

What is needed, therefore, is a controlled (starved) air gasification process, which thermally converts waste products into a combustible gas while eliminating or reducing the above-noted, and other, drawbacks. For example, the presently disclosed system provides, among other things, the control parameters for monitoring and controlling the production from gasification chambers, the modeling of said production for coordination to energy generation, for monitoring emissions discharged to the atmosphere, unique design and operation attributes that address the issues related to technology scale-up by incorporating a modular design and unique configuration of both Primary and Secondary Combustion design, as well as providing guaranteed energy generation when deficiencies of operation occur.

SUMMARY

The present disclosure advantageously addresses one or more of the aforementioned deficiencies by providing a waste-to-energy conversion apparatus comprising a primary combustion chamber capable of holding a load of waste, and the primary combustion chamber further comprises a heat source to heat the waste and generate a syn gas stream, grates, within the primary chamber, capable of supporting the load of waste during heating, a mixing chamber wherein the synthesis, or syn, gas is mixed with additional combustion gas, a multi-chambered secondary combustion chamber for combusting the mixture of syn gas and additional combustion gas, and an energy extraction system for extracting the heat energy generated by the combustion of the mixture of syn gas and additional combustion gas.

In one embodiment, there is provided a method of operating a waste-to-energy conversion process, the method comprising heating waste loaded into at least one of a plurality of primary combustion chambers, extracting syn gas from said at least one of a plurality of primary combustion chambers, mixing said syn gas with an additional combustion gas, inducing turbulent flow in the mixed syn gas and additional combustion gas, combusting said mixed syn gas and additional combustion gas in a multi-chambered secondary combustion chamber, and extracting energy from heat energy generated by the combustion of the mixed syn gas and additional combustion gas.

In another embodiment, there is provided primary combustion chamber grates comprising a waste support platform, a fluid flow path adjacent to the waste support platform, and ash removal openings to facilitate the removal of ash from the waste support platform. The grates may comprise a fluid flow circuit that enables the circulation of fluid in the fluid flow path to extract heat from the waste support platform. In some embodiments, the fluid flow circuit circulates fluid to other waste-to-energy system components.

In another embodiment, there is provided a turbulent air ring for mixing syn gas with an additional combustion gas, the turbulent air ring comprising a substantially ring-shaped outer duct to enable the flow of said additional combustion gas therethrough, an injection port in fluid communication with the outer duct to enable the flow of the additional combustion gas to an inner duct portion and wherein said inner duct portion enables the flow of syn gas therethrough, and wherein said flow of additional combustion gas through said injection port induces turbulent flow in said syn gas.

In another embodiment, there is provided a multi-chambered secondary combustion chamber for use in a waste-to-energy conversion system, said multi-chambered secondary combustion chamber comprising a first combustion chamber, and a second combustion chamber, located substantially above said first combustion chamber.

In another embodiment there is provided an automatically operating safety valve for use with a waste-to-energy conversion system, said safety valve comprising a cover portion, a biasing mechanism to keep the cover portion in a closed position during operation of the waste-to-energy conversion system within a predetermined pressure range, and to allow opening of the cover portion when the predetermined pressure range is exceeded, and a closing mechanism to return the cover portion to a closed position when the predetermined pressure range is again attained.

In another embodiment there is provided a monitor and control system for use in operating a waste-to-energy conversion system, the monitor and control system comprising a control unit in direct data communication with the waste-to-energy conversion system, a communicator capable of communicating data from said control unit to an operation center, an I/O device to monitor or control a parameter of the waste-to-energy conversion system, and communicating data related to the parameter to the control unit.

In another embodiment there is provided a method of operating a waste-to-energy conversion process, the method comprising heating waste loaded into a first chamber of a plurality of primary combustion chambers, extracting syn gas from said first chamber, mixing said syn gas with an additional combustion gas, inducing turbulent flow in the mixed syn gas and additional combustion gas, combusting said mixed syn gas and additional combustion gas in a multi-chambered secondary combustion chamber, and extracting energy from heat energy generated by the combustion of the mixed syn gas and additional combustion gas.

In another embodiment there is provided a mobile waste-to-energy conversion unit comprising a primary chamber, grates, within said primary chamber, capable of supporting said load of waste during heating, a mixing chamber wherein said syn gas is mixed with additional combustion gas, a secondary chamber for combusting the mixture of syn gas and additional combustion gas, and energy extraction systems, wherein, the primary chamber, grates, mixing chamber, secondary chamber, and energy extraction systems are sized to fit within a shipping container. In some embodiments, the shipping container is a standard, sea-going shipping container for use on freighter ships.

The present disclosure will now be described more fully with reference to the accompanying drawings, which are intended to be read in conjunction with both this summary, the detailed description, and any preferred or particular embodiments specifically discussed or otherwise disclosed. This disclosure may, however, be embodied in many different forms and should not be construed as limited to the embodiments set forth herein; rather, these embodiments are provided by way of illustration only so that this disclosure will be thorough, and fully convey the full scope of the invention to those skilled in the art.

BRIEF DESCRIPTION OF THE DRAWINGS

FIG. 3D shows a schematic plan view of an ash removal system according to some embodiments of the invention.

FIG. 5F is an illustration of baffles for some embodiments of a secondary combustion chamber.

FIGS. 5G-5I are illustrations of some embodiments of a turbulent air ring.

FIGS. 9A-9B are a graph and data chart representing synthesis gas production in accordance with some embodiments of the present system.

DETAILED DESCRIPTION

In the following description, reference is made to the accompanying drawings that form a part thereof, and in which is shown by way of illustration specific exemplary embodiments in which the invention may be practiced. These embodiments are described in sufficient detail to enable those skilled in the art to practice the invention, and it is to be understood that modifications to the various disclosed embodiments may be made, and other embodiments may be utilized, without departing from the spirit and scope of the present invention. The following detailed description is, therefore, not to be taken in a limiting sense.

Figure 1:
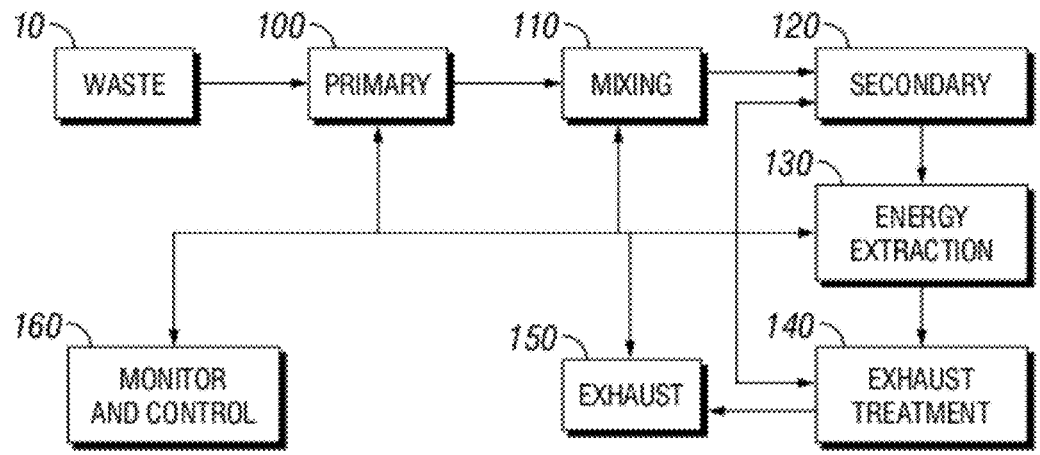
FIG. 1 is a schematic representation of the apparatus in accordance with some embodiments of the invention.

With reference to FIG. 1, a general description of the overall system for waste-to-energy conversion will be provided. FIG. 1 is a schematic representation of the apparatus in accordance with some embodiments of the invention. As shown, a source of waste 10 may be used to fuel the waste-to-energy process. The waste 10 may come from municipal sources (e.g., residential, office, commercial, governmental, and other office buildings), from agricultural sources (e.g., farms), from military sources (e.g., military base, airfield, or other camp), from medical sources (e.g., hospitals), or from any combination of the above.

Typically in the past, waste 10 is of the type that would be buried in a landfill, burned in an incinerator, or otherwise disposed of at a waste depository. Waste 10 may comprise wet, damp, or otherwise moist items as well as dry materials. Waste 10 may also comprise unsorted materials, or in some embodiments, waste 10 may be sorted into groups of like materials, or groups of materials that are desirable to process together.

In some embodiments, waste 10 need not be sorted, nor dried, nor otherwise processed, prior to loading into primary 100. Depending upon the layout of the facility, loads of waste 10 may be deposited at some initial loading location, such as a collection bin, conveyor, tilting floor, elevator, linked belt, or other mechanism to compile loads of waste 10 and have waste 10 accessible for loading into primary 100.

Loading of waste 10 into primary 100 may be accomplished in any suitable fashion, and may also vary depending upon facility layout. For example, waste 10 may be loaded into the primary 100 with loading equipment and vehicles, such as forklifts, back hoe or front end loaders, dump trucks, cranes, or the like. For some embodiments, such as the mobile units described herein, it may be possible to load waste 10 into primary 100 by hand or with hand-operated equipment such as wheelbarrows, rakes, and shovels.

It is not necessary to compact or otherwise arrange the waste 10 in the primary 100. In some embodiments, it is sufficient to loosely load the waste 10 into the primary 100. The capacity of the primary 100 will vary depending upon the desired processing capacity and the physical requirements of the facility. Typically, primary 100 when loaded will hold from fifteen to seventeen tons of waste 10.

After loading, primary 100 is sealed and partially evacuated prior to beginning the conversion process. In some embodiments, the pressure differential between the primary 100 and the exhaust stack (part of exhaust treatment 140) may be sufficient to create a partial vacuum inside primary 100 when sealed. In some embodiments, it may be advantageous to assist the creation of the partial vacuum by operating an induced draft fan to remove air from the primary 100 until a sufficient pressure is reached. For some embodiments, a vacuum of −0.1 atm to −0.3 atm is a desirable operating atmospheric condition.

As the vacuum inside primary 100 reaches the desired level, it may be desirable to heat the waste 10 inside the primary 100. Heating may be accomplished in any suitable manner. In some embodiments, it is desirable to heat waste 100 by using multiple fossil fuel burners located in an area below the waste 10. Locating the burners below the waste 10 may be advantageous because it helps to reduce turbulence in the gas stream above the waste 10 and reduce the amount of particulate matter entering the gas stream. Other locations for the burners may also be used.

Heating may be controlled using appropriate monitoring devices represented schematically as monitor and control 160. For example, thermocouples, or other temperature sensing devices, may be located at appropriate locations in primary 100 to detect the temperature inside primary 100. The detected temperature value may provide input to the control mechanisms operating the burners so that they may be turned on, or off, according to the desired temperature set point. Other monitoring and control 160 devices may also be implemented. For example, oxygen sensors, carbon monoxide sensors, or other constituent gas sensors may be used to monitor and control system operation.

In some embodiments, an internal set point of 450° F. is a typical internal primary 100 temperature value. The temperature set point may vary depending upon the type and quantity of waste 10, as well as other factors, such as external ambient temperature and the like.

As it is heated, waste 10 oxidizes into synthesis gas. The synthesis, or syn gas, is drawn out of the primary 100 by the pressure differential due to the partial vacuum inside primary 100 for eventual use in the rest of the downstream system.

Inside primary 100, heating of waste 10 typically continues until the waste 10 is reduced primarily to bottom ash. Various techniques of operation enabled by sub-systems of primary 100 allow for more complete reduction of waste 10. For example, air injectors, located in strategic positions around primary 100 may be used to lift, or otherwise disturb, waste 10 pile and expose additional waste 10 material to the heating and reduction process.

In addition, some embodiments of primary 100 implement fluid-cooling in grates, described in more detail below, that support the waste 10 inside primary 100. Cooling of the grates helps to maintain the integrity of the materials in the grates which allows the reduction process to operate more completely. In some embodiments, the fluid used to cool the grates may be advantageously implemented to pre-heat other parts of the system, such as the energy extraction system 130.

Upon completion of the reduction and conversion process within primary 100, the ash from waste 10 may be removed and further processed. For example, ash may be supplied to concrete manufacturing companies or other manufacturers for use in their processes and products.

The syn gas created during the oxidation process exits the primary 100 and proceeds to mixing 110 where the syn gas may be mixed with additional air, oxygen, or other gases to facilitate the later burning of the syn gas. Mixing 110 may be accomplished in any suitable fashion. In some embodiments, mixing 110 may occur in a turbulent air ring (TAR), which is described in more detail below. The TAR may include dampers, fans, or other gas flow regulators. Monitor and control 160 systems may be implemented to operate the dampers, fans, or other gas flow regulators depending upon monitored system values such as pressure, gas constituents, temperature, or other values.

In general, the TAR is designed to introduce turbulence into the syn gas flow, increase the pressure, prepare the syn gas for combustion, and introduce oxygen ($O_2$) or other combustion gases. In some embodiments, the design and operation of the TAR will cause auto-combustion of the syn gas.

After mixing 110, the syn gas enters the secondary combustion chamber 120. Typically, the secondary 120 is preheated to facilitate combustion of the syn gas. Secondary 120 may be preheated in any suitable fashion, such as through the use of additional burners or other heaters. Likewise, monitor and control 160 may be implemented to monitor system conditions such as pressure, temperature, constituent gas make-up, and the like, and to correspondingly control the operation of fans, burners, injection jets, and the like, in order to maintain a consistent and complete combustion of the syn gas stream.

For some embodiments, it is advantageous to implement multiple chambered secondary combustion chambers 120. One possible configuration is the "over-under" structure for secondary 120 which is described more completely below. Other multi-chambered configurations, such as a "side-by-side" configuration, configurations implementing more than two chambers, or some other configuration are also possible. Some advantages of such a configuration are that, for the same overall volume, it gives a smaller cross section for the secondary 120 which provides a better heat reflection back into the syn gas stream and enhances combustion. In addition, the smaller cross section can increase the stream turbulence which lengthens the time in the secondary 120 and improves the completeness of the burn.

The output of secondary 120 is the clean, heated, gas stream resulting from the secondary 120 combustion process. This heated gas stream serves as input to the energy extraction 130 system. Energy extraction may be accomplished in any suitable fashion. For example, heat energy may be extracted from the gas stream by contact with surfaces in a boiler or other device to transfer the heat energy to a working fluid (e.g., water, water vapor, an organic fluid for use in an Organic Rankine Cycle heat recovery system, or the like). Energy extraction 130 may include additional energy extractors, such as secondary boilers, or the like, to extract additional energy from the heated gas stream. In addition, other energy extraction systems may also be implemented such as kinetic energy extraction (e.g., a turbine), thermoelectric converters (e.g., Peltier-type devices), or the like.

As described previously, the boiler, or other energy extraction appliances, may be preheated using the coolant from the grates in the primary 100 in a closed fluid circuit. One additional advantage of the described configuration is that the output of secondary 120 is a relatively clean gas stream. Therefore, one result is reduced fouling and deposits on the boiler or other energy extraction system. As with other parts of the system, monitor and control 160 systems can be implemented to optimize the extraction of energy from the heated gas stream.

After energy extraction 130, the gas stream, now substantially cooled, proceeds to exhaust treatment 140 systems. Any suitable exhaust treatments 140 may occur and will depend upon the type of waste 10 and any regulatory requirements for the exhaust 150. In some embodiments, exhaust treatment 140 includes lime (calcium oxide (CaO)) injection to remove hydrochloric acids (HCl) or sulfur dioxides ($SO_2$) from the exhaust 150. In some embodiments carbon (C) may be used to remove mercury (Hg) from the exhaust 150. Monitoring and control 160 is implemented to monitor the exhaust 150 constituents and characteristics, and control the operation of the various treatment systems in accordance with the monitored values.

Other types of exhaust treatment 140 are also possible. For example, mechanical filtering can be performed to remove particulate matter from the exhaust stream. In some embodiments, stainless steel filters may be arranged to remove any remaining particulates from the exhaust 150.

Upon completion of exhaust treatment 140, the exhaust 150 is released from the system through an exhaust stack or other suitable release structure. Monitoring and control 160 may also be implemented at the exhaust stack to monitor the characteristics of the exhaust and control corresponding exhaust controls (e.g., dampers, valves, fans, or the like) in response.

Figure 2A:
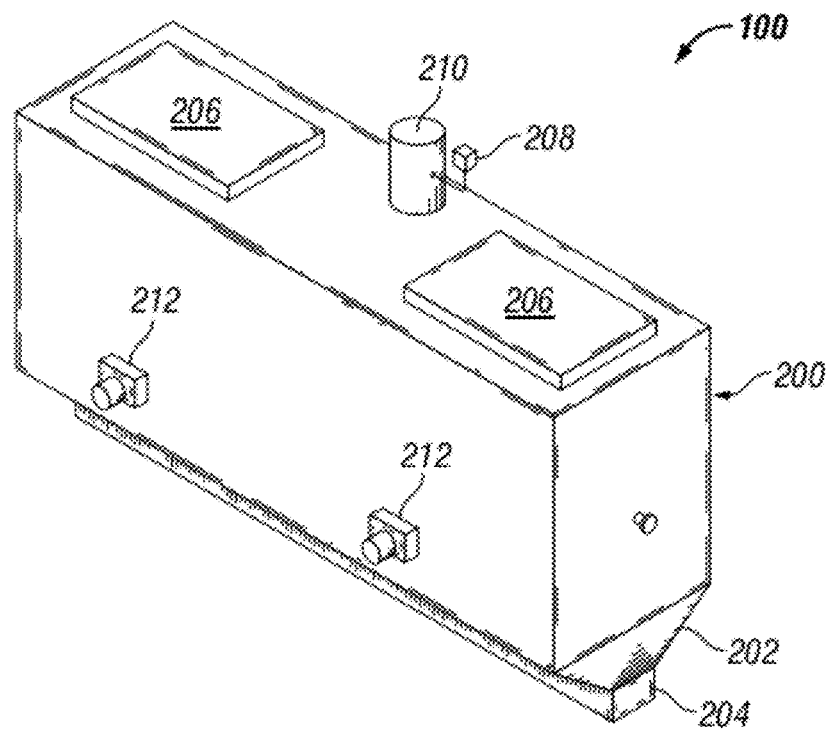
FIG. 2A is an illustration of a primary 100 according to some embodiments of the invention.

Additional details of embodiments of the above-described system are provided in the following description. FIG. 2A is an illustration of a primary 100 according to some embodiments of the invention. As shown in FIG. 2A, some embodiments may employ a generally rectangular shaped primary 100, with an upper portion 200 and a lower portion 202. The embodiment shown contemplates loading waste 10 (not shown in FIG. 2A) into primary 100 from the top, through sealable doors or hatches 206. Inside primary 100, lower portion 202 of primary 100 may also include grates, screens, or other structures to hold waste 10 near burners 212 for heating and conversion to syn gas. As also shown in FIG. 2A, the bottom portion of primary 100 may also be tapered or funnel-shaped as indicated at 204. Such a configuration facilitates removal of ash and end products through appropriate doors or hatches in portion 204. In some embodiments, the grate structure may be integral with the doors or hatches in portion 204.

As shown, primary 100 may include one or more sealable doors 206 in the upper portion 200 through which waste 10 may be loaded into the primary 100. The doors 206, as well as the rest of the primary 100 walls are made of refractory materials to help contain the heat of the conversion process, and may include reinforcement to be structurally sound enough to withstand any unintended rapid combustion (i.e., explosions) that may result from some waste 10 sources or combustion conditions.

The refractory materials may comprise any suitable refractory materials. For example, the primary 100 walls and doors 206 may be made from stainless steel hangers, ceramic refractory, including ceramic insulating fiber, and a steel or concrete encasing structural shell. In some embodiments, the primary 100 walls may comprise an inner wall of 5⅝" high-temperature refractory material, backed by ⅜" refractory fiberboard, and a casing of ¼" plate Carbon Steel with Carbon Steel structural bracing. Other embodiments may comprise primary 100 walls of refractory material encased in approximately 10" of steel-reinforced concrete. Other combinations of refractory and structural materials are also possible.

Of course, the size and shape of primary 100 may vary according to expected capacities, constraints of the installation locale, and other considerations. Typically, a fifteen ton primary will be about 100 cubic yards in volume.

As shown in FIG. 2A primary 100 may also include sensors or controllers 208 that communicate with the monitor and control systems 160. Sensors or controllers 208 may include any of the temperature monitors, constituent gas monitors, damper motors, fan motors, or the like that communicate with the monitor and control systems 160 to optimize the waste-to-energy conversion process.

As shown for this embodiment, sensors or controllers 208 may be mounted near the syn gas output port 210 which facilitates delivery of syn gas from the primary 100 to downstream portions of the system. Of course, other sensors or controllers 208 may be located at other locations in or around primary 100 depending upon the contemplated monitoring or control function.

As noted above, for some embodiments, it may be desirable to locate burners 212 in the region 204 below the waste 10. Such a location helps to minimize the turbulence and particulates introduced into the syn gas stream created in the primary 100. Other locations for burners 212 may also be possible.

Figure 2B:
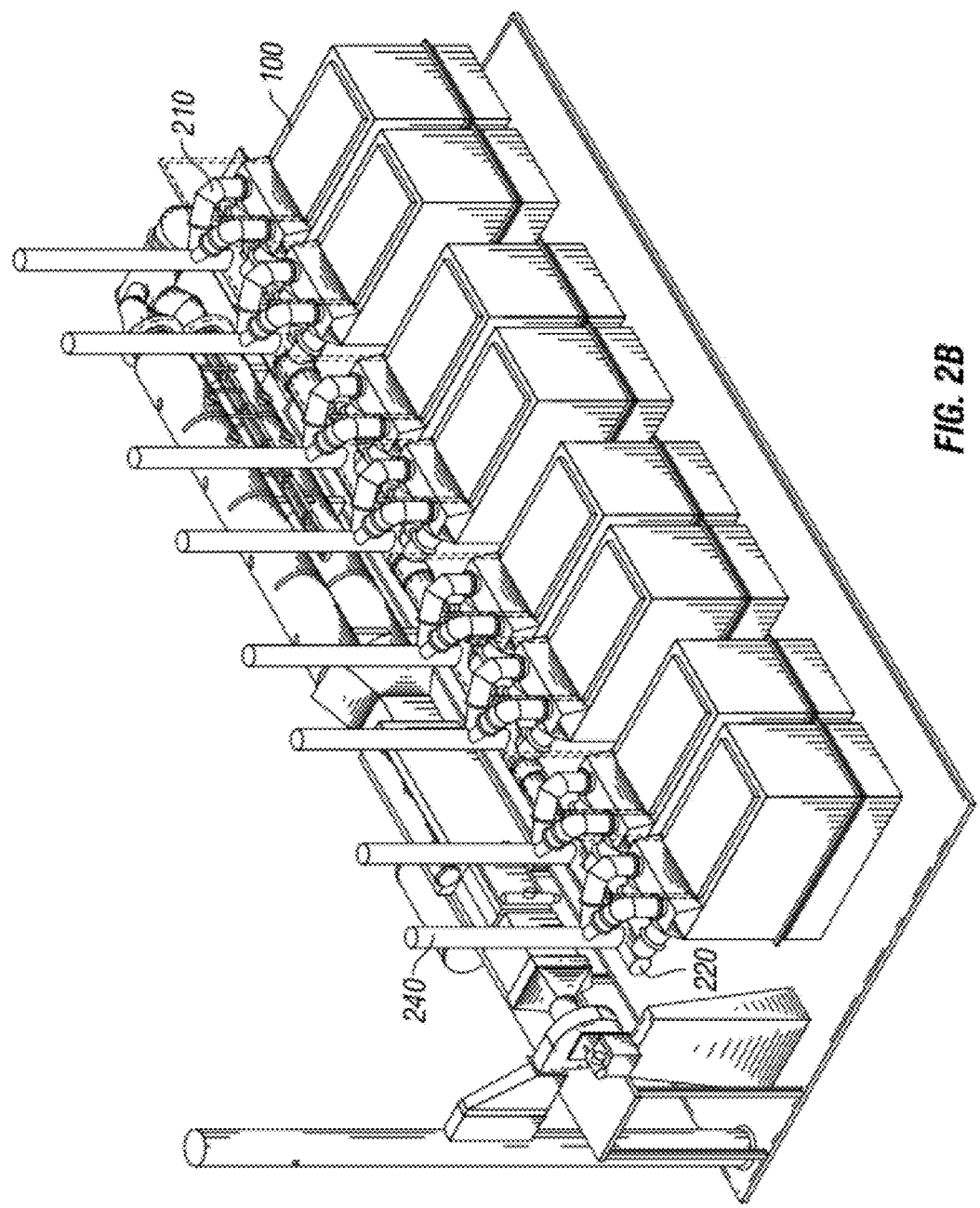
FIG. 2B is an illustration of multiple sets of waste-to-energy conversion units connected to off-gas ducting according to some embodiments of the invention.

As shown in FIG. 2B, some embodiments of primary 100 may also include an off gas duct 220 to direct the syn gas downstream for further combustion and conversion. Included in off gas duct 220 may be a number of monitor and control devices, such as temperature sensors, gas constituent sensors, pressure sensors, motorized dampers, controllable fans, or the like. These systems provide input to, or receive control signals from, monitor and control 160 systems to maintain optimal operation of the conversion process. In addition, primary 100 may include a safety relief duct 240 that may vent directly to atmosphere or to some other containment vessel. Safety duct 240 may provide compensation for any explosive conditions that may arise from the heating of waste 10.

Figure 12:
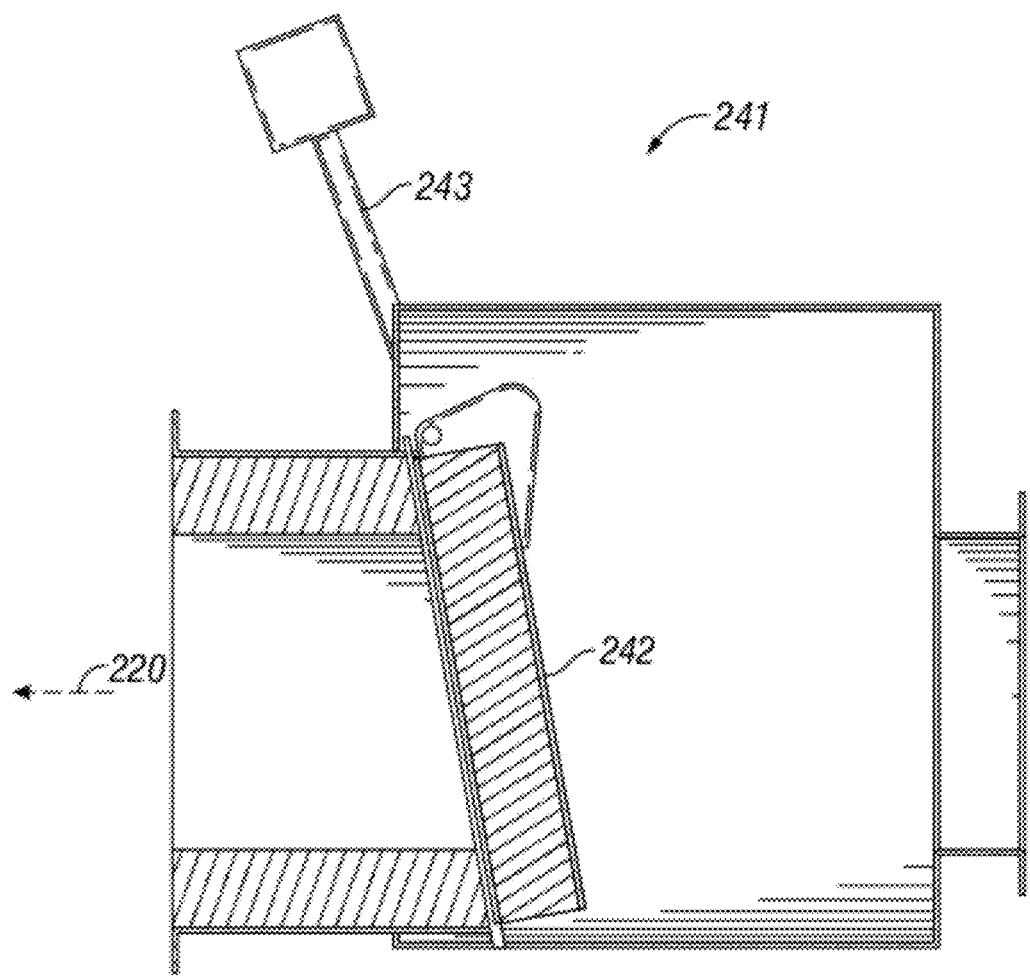
FIG. 12 is a schematic of one embodiment of an automatically operating pressure relief valve in accordance with the present system.

As shown in FIG. 12, some embodiments of safety duct 240 may include an automatically operating pressure relief valve 241. As shown, relief valve 241 may provide a pressure relief port in communication with off gas duct 220. Relief valve 241 may be biased in a closed position. Biasing of relief valve 241 may be accomplished in any suitable fashion. For example, valve 241 may be constructed of an appropriate weight to remain closed during expected "normal" operating pressures and fluid flows. Other biasing methods, such as a friction fit, or spring-loaded clamp, may also be implemented. When the pressure within off gas duct 220 exceeds a predetermined amount such that the biasing is overcome, cover 242 may open to allow release of the excess pressure. A closing mechanism 243 may be included to return cover 242 to the closed position once the excess pressure is released. Closing mechanism 243 may comprise a counter-balance mass, a spring, a piston, an electric motor, or the like. Other pressure relief valve configurations are also possible.

Figure 2C:
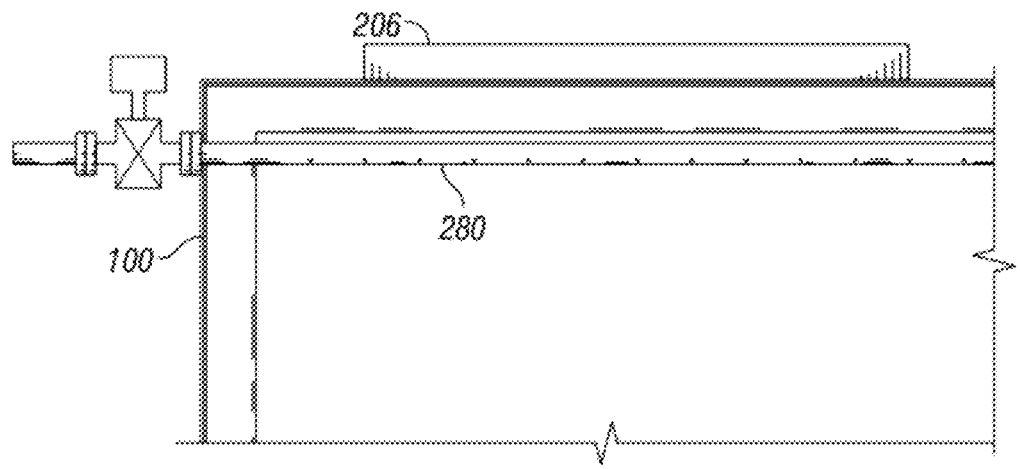
FIG. 2C is an illustration of combustion control apparatus according to some embodiments of the invention.

As illustrated in FIG. 2C, and as an additional control over the conversion process in the primary 100, it may be desirable to provide a quench tube or sprinkler system 280 inside primary 100. In this manner, water or other fluid may be added to the primary 100 to slow, or otherwise control the, conversion process.

Figure 3A:
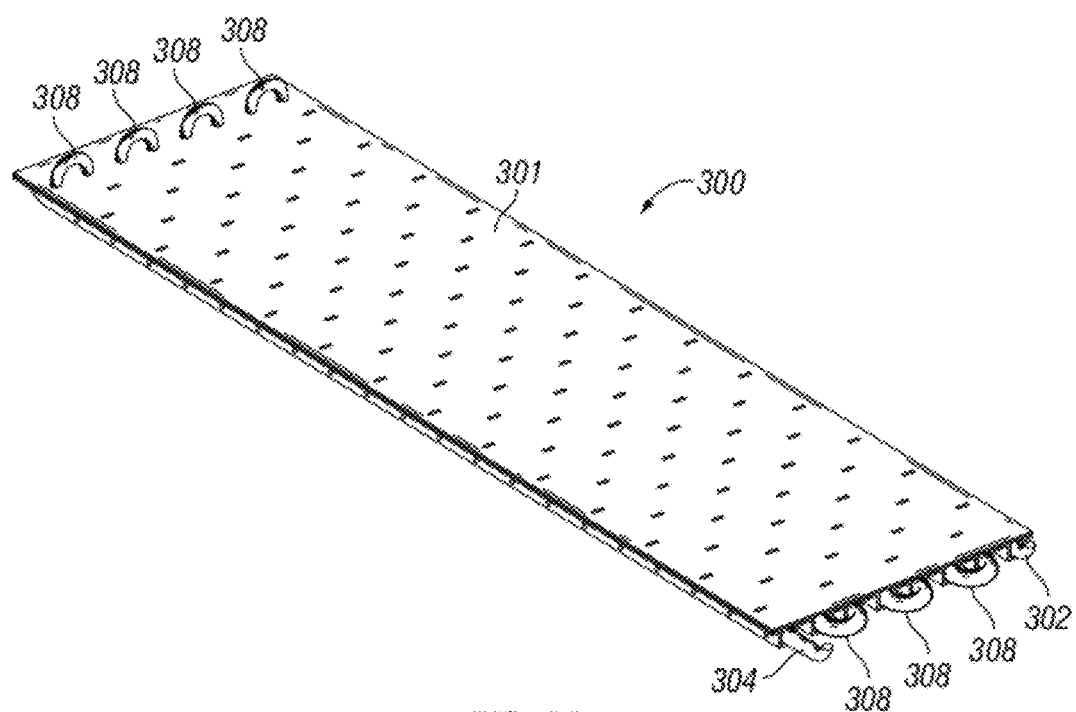
FIG. 3A-3C shows several views of some embodiments of a grate system to enable fluid cooling of the grates.
Figure 3B:
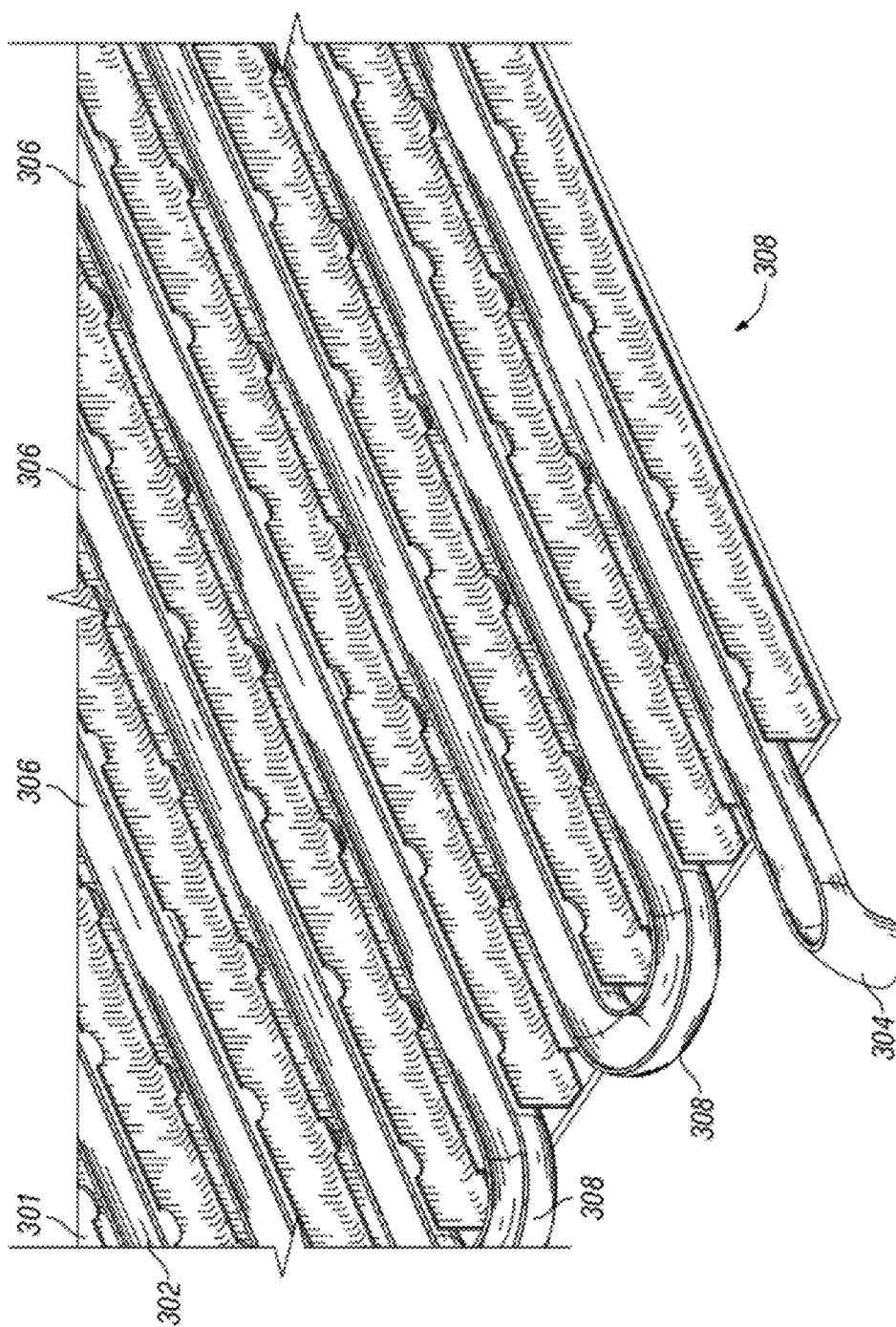
Figure 3E:
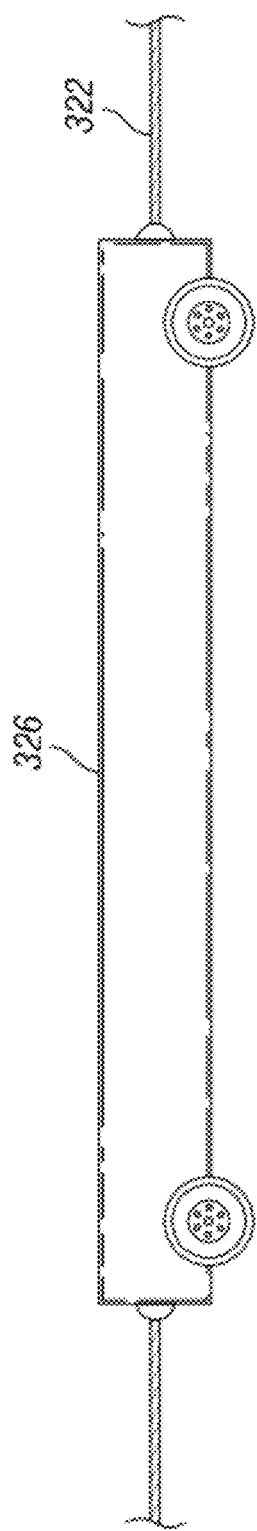
FIG. 3E shows a schematic plan view of an ash removal cart according to some embodiments of the invention.
Figure 3C:
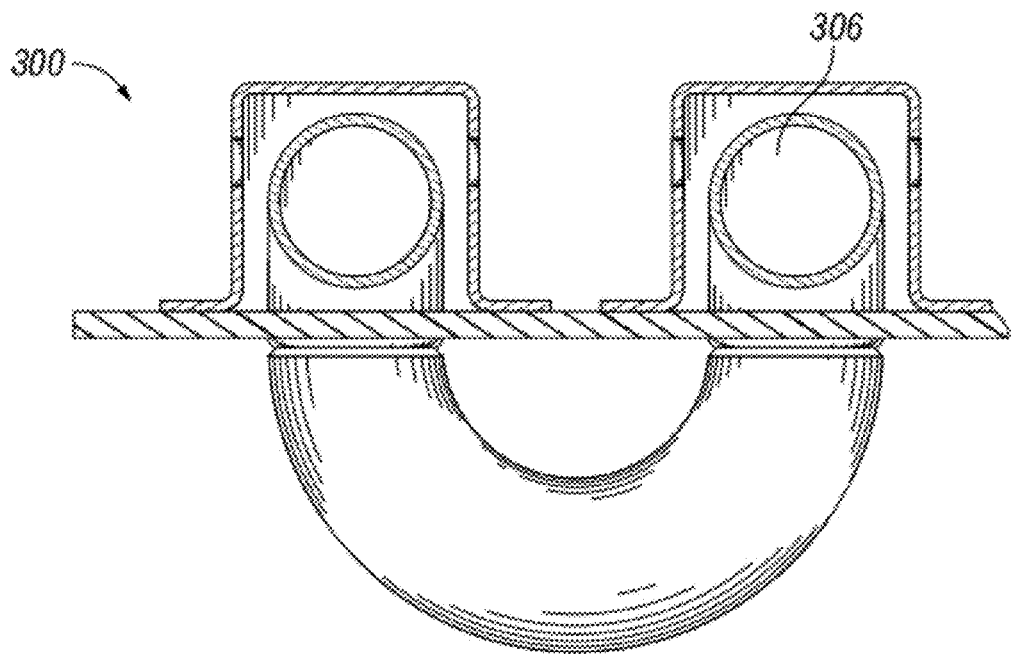

FIGS. 3A-3C shows several views of some embodiments of a grate system to enable fluid cooling of the grates. As generally indicated at 300 the grates may comprise steel structures arranged in a grill or grate fashion. The grates 300 may form halves, or parts, of a double door (e.g., an outwardly opening "clam shell" or "bomb bay" door) at the bottom of primary 100. Thus, the grates 300 may pivot about one end 301 in order to open and close. Additionally, or alternatively, the grates 300 may be partially fixed with retractable moving parts that slide out allowing the grates to open or close and a vibratory ash extraction process may be implemented. Other configurations for vibrating the ash are also possible. Generally, the grates 300 support the waste 10 during the heating and conversion to syn gas. Thus, air flow spaces are included in the grates 300 to enable sufficient air to reach the heated waste 10 material. Further, some embodiments of grates 300 enable the injection of air or other into the waste 10 pile.

For some embodiments, it is advantageous to include fluid cooling in the grate 300 structure. The fluid cooling may be accomplished using water, air, or any other appropriate coolant fluid. As described above, some embodiments may circulate the heated grate coolant to other parts of the system for preheating of those components (e.g., the boilers). FIG. 3B shows a cut-away view of one embodiment for circulating cooling fluid through the grates 300. As shown, a coolant inlet 302 may be formed at one end (e.g., the pivot 301 end) to introduce fluid at one side of the grate 300. The fluid may flow through passages 306 within the grate 300, and in the process, remove heat from the grate 300. The fluid flow may continue through grate 300 to a return path 308 near the same end, or alternatively the other end, of the grate 300. The return path 308 may traverse the grate 300 again and exit out of a coolant outlet 304 for further circulation throughout the system. Of course, any suitable coolant path through the grate 300 may be implemented. Likewise, pumps, valves, and other associated circulation equipment may be used to facilitate the fluid flow through the grates 300. In addition, appropriate sensors and controllers may be located in or around grates 300 and may communicate with monitor and control 160 systems.

FIG. 3C shows a cross sectional view of the grate 300 in accordance with some embodiments. As shown, fluid circulation may be accomplished using suitable piping (e.g., steel piping) through square profile steel channel. Other shapes are also possible for the grates 300.

After completion of a thermal conversion of the waste 10, the grates 300 may be opened to allow for removal and cleaning of the ash and other residue left in primary 100. In some embodiments, it may be desirable to allow the ash and residue to empty onto a conveyor belt or the like to transport the ash for further processing.

FIG. 3D shows one embodiment for ash removal in accordance with the present disclosure. As shown, anchors 320, such as posts, may be placed adjacent to the primary chamber 100 and a conveyor 322, such as a cable, may be arranged to run between the anchors 320. An ash receptacle 326, such as a cart, may travel along the conveyor 322 so that it traverses underneath the primary chamber 100 and can be positioned to receive ash and other solid residue from the oxidation process through the opening of grates 300. Upon being filled with ash and other solid residue, the receptacle 326 may remove the ash and residue to other parts of the system for further processing. FIG. 3E shows one example of a receptacle 326.

For example, in some embodiments, receptacle 326 may be emptied onto additional conveyors 328, such as link-belt conveyors or the like, to be further processed. Further processing may include magnetic separators 330 (e.g., a roller drum magnet) to separate Ferrous materials out of the ash residue, non-magnetic metal separators 338 (e.g., Eddy current separators) to separate non-magnetic metals (e.g., Aluminum) out of the ash residue, mechanical separators 334 (e.g., crushers) to sort or remove ash residue by size, and other sorting and separating equipment. Various conveyors 332, 328, and 340, may be used to remove the separated ash residue to respective storage containers or bins 332, 334, and 336. Other separation systems and layouts may also be implemented.

Figure 4:
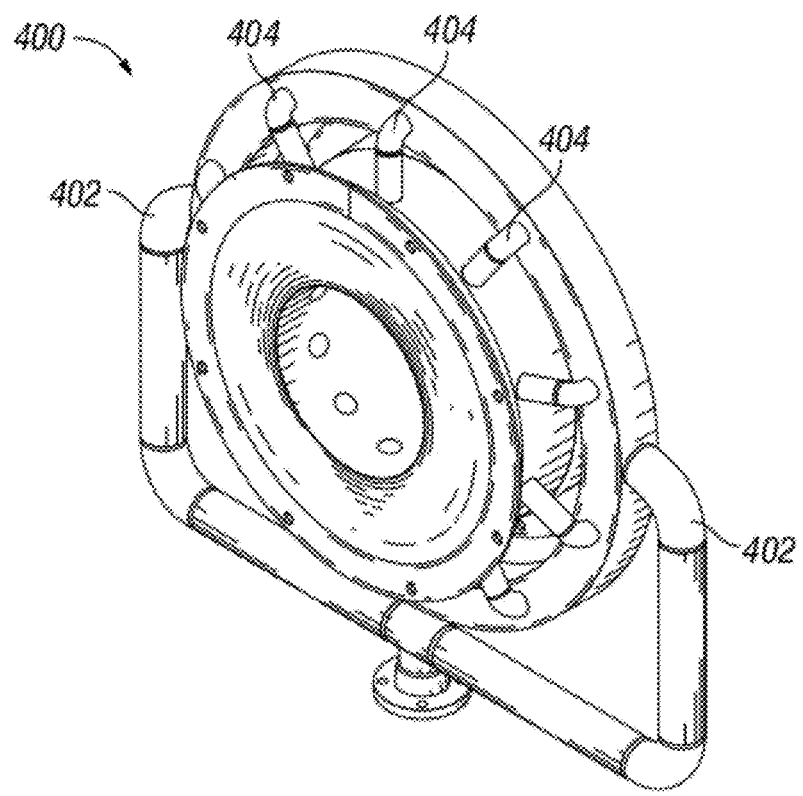
FIG. 4 is a schematic representation of several views of embodiments of a turbulent air ring (TAR).

FIG. 4 is a schematic representation of several views of embodiments of a turbulent air ring (TAR). As disclosed above, the TAR 400 may comprise a component of mixing 110 systems for mixing oxygen, air, or other combustion gases with the syn gas exiting the primary 100. As shown, TAR 400 may be generally circular in shape and may be of a unitary construction as shown, or may comprise a segmented collection of ducting to form a ring. Input ducts 402 are in communication with variable speed fans or blowers. The blowers introduce the air or other gas into TAR 400 via the input ducts 402. As shown, a number of output ducts 404 are arranged around the inner side of TAR 400. The air or other gas in TAR 400 exits the TAR 40 via the output ducts 404 and causes turbulence and mixing of the syn gas exiting from the primary 100.

Embodiments of TAR 400 may include sensors, monitors, and other controllable devices which may communicate with monitor and control 160 systems to enable optimization of system operation. For example, the TAR 400 may increase or decrease static pressure within the system, which may be modulated by dampers and/or the variable speed blowers and can be correspondingly controlled to reach desired static pressure values. In some embodiments a pressure range of 3 to 6 inches WC may provide optimal operation. In addition to mixing the syn gas, the TAR 400 acts like something of a carburetor or choke ring in that it moderates the amount, and make-up, of syn gas reaching the secondary 120.

Figure 5A:
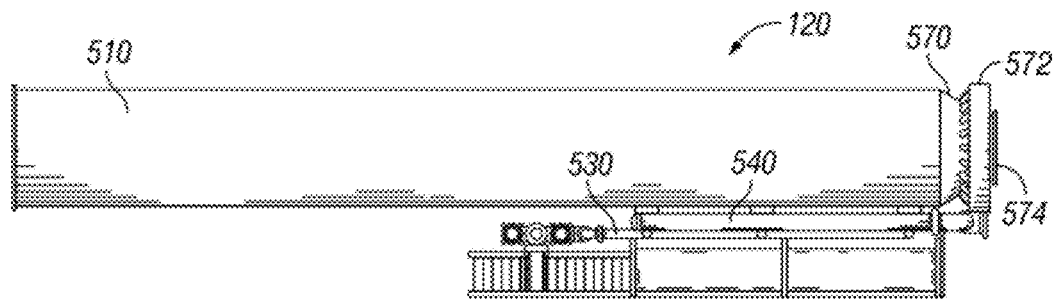
FIG. 5A is a top-view illustration of some embodiments of a secondary combustion chamber.
Figure 5B:
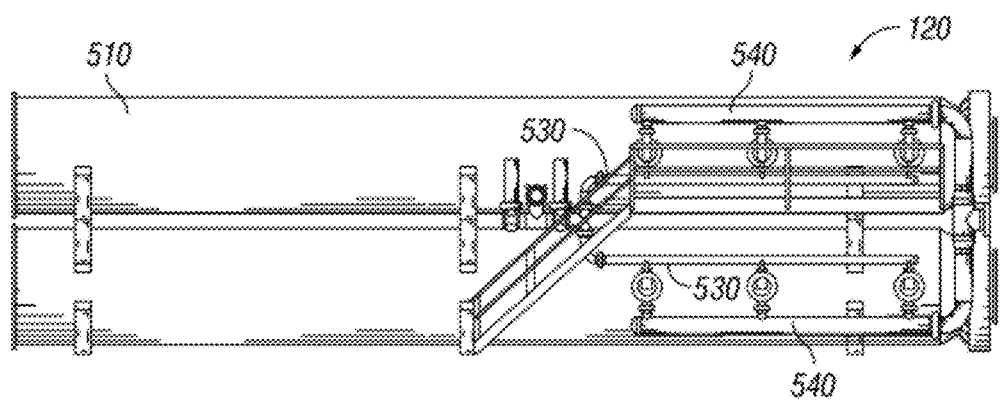
FIG. 5B is a side-view illustration of some embodiments of a secondary combustion chamber.
Figure 5D:
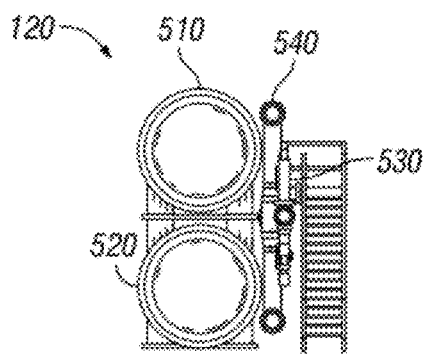
FIG. 5D is a front-view illustration of some embodiments of a secondary combustion chamber.
Figure 5C:
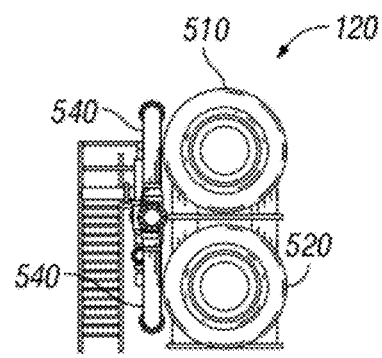
FIG. 5C is an end-view illustration of some embodiments of a secondary combustion chamber.

FIG. 5A is a top view, FIG. 5B is a side-view, FIG. 5C is an end view, and FIG. 5D is a front view illustration of some embodiments of a secondary combustion chamber. The secondary 120 is preferably configured to provide a relatively long path to completely combust the syn gas and to extract heat energy from the combustion process. To that end, FIG. 5 shows an embodiment of the secondary 120 in an "over-under" configuration. In this configuration, the syn gas travels through two chambers 510 and 520 during combustion in secondary 120. Using dual chambers allows for a smaller cross-section of each chamber 510 and 520, with the same overall throughput of syn gas. The smaller cross-section of each chamber 510 and 520 contributes to the turbulence of the syn gas flow (i.e., it slows it) and increases the heat reflectivity back into the combustion process which contributes to a more complete burn. Other geometries, such as side-by-side, etc., flow interrupters (e.g., baffles 560, as illustrated in FIG. 5F), and path flows are also possible.

As also illustrated in FIGS. 5A-5D, secondary 120 may also include ducting or piping that enables the introduction of additional combustion air or supplemental combustion gases into secondary 120. For example, a gas manifold 530 may be provided to each chamber 510 and 520 to allow for introduction of supplemental combustion gas to control the operation of the system. Likewise, air manifold 540 may be included to enable the introduction of additional combustion air into the secondary chambers 510 and 520.

Figure 5E:
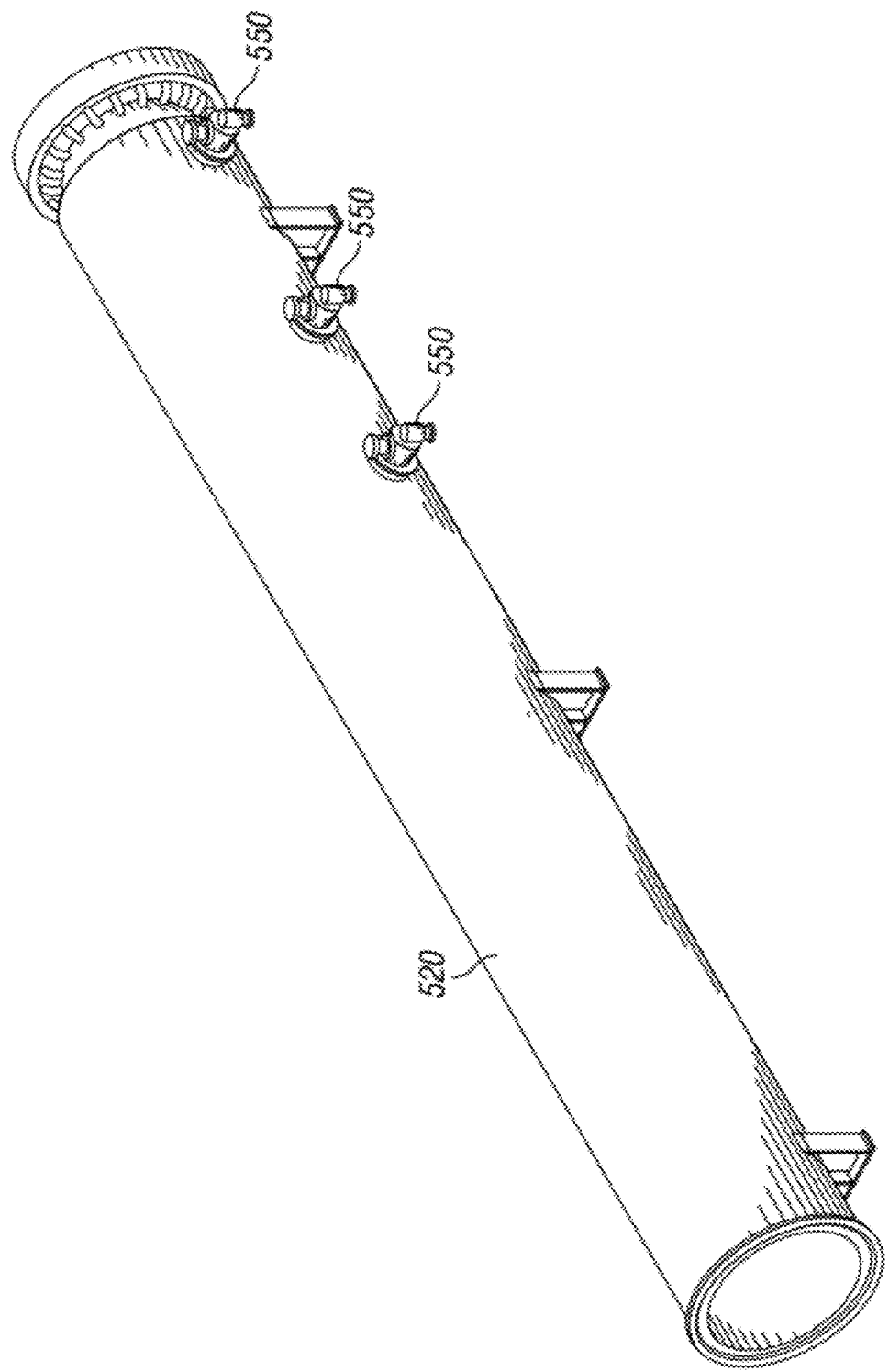
FIG. 5E is an illustration of burners for some embodiments of a secondary combustion chamber.

FIGS. 5E-5H show illustrations of details of the secondary 120 in accordance with some embodiments of the disclosed system. As shown in FIG. 5E, and in conjunction with gas manifold 530, supplemental burners 550 may be provided on either, or both, chambers 510 and 520 to enable supplemental combustion or ignition of the syn gas. While 3 burners 550 are shown in FIG. 5E, it is possible to include any number and configuration of burners. FIG. 5F shows one embodiment of path flow interrupters, in the form of baffles 560, that can be implemented to lengthen the syn gas flow path, introduce turbulence, and slow the syn gas flow in order to accomplish, among other things, more complete combustion of the syn gas.

FIGS. 5G-5H illustrate another embodiment of a TAR 400. As illustrated, TAR 400 may comprise and inlet 570 that connects to either chamber 510 or 520, the ring portion 572 that facilitates the desired flow of the syn gas into the secondary 120, and a flange 574 or other coupler that enables the connection of the inlet to the off gas duct 210. As also shown, a number of conduits 404 (e.g., as shown, twenty conduits 404) direct the flow of the syn gas into the secondary 120 via ports 576. Other configurations for the TAR 400 and its components are also possible.

For some embodiments, it is desirable to build the secondary 120 so that the elevated heat on the inside of the chamber is not transferred to the outside of the chamber. To achieve suitable insulation, in some embodiments, the secondary 120 may be constructed of an inner layer of highly insulating and heat resistant material (e.g., approximately 5" of ceramic material), followed by a fiber insulation layer (e.g., approximately 3" of synthetic wool, fiberglass, or the like), followed by another layer of ceramic insulation (e.g., a ceramic fiber blanket), followed by an outer steel jacket.

The heat energy generated during combustion in secondary 120 is then extracted in energy extraction 130 systems. The type of energy extraction 130 may vary depending upon the desired application. For example, in some circumstances, the heat energy may be useful in and of itself without further conversion (e.g., as part of a furnace system to heat a building or other structure). In other circumstances, it may be desirable to convert the heat energy to electricity or some other transmittable form of energy. In embodiments where it is desirable to convert to electricity, energy extraction 130 may include a boiler or the like to use the heat from combustion in secondary 120 to heat water, or some other working fluid, and power a steam turbine, or the like, and drive an electrical generator.

Numerous boiler and generator systems are known and can be adapted to work with the above described system. One advantage of the present system is that carry over particulate from primary 100 to secondary 120 is near non-existent. With this lack of particulate, the transient toxins, such as sulfurs, hydrochloric acids, and metals, etc., that would normally be part of the syn gas stream remain in the ash, or are never formed. With this attribute of clean combustion products, boilers with thin finned wall tubes can be utilized, without the complications of soot buildup and corrosion, providing for a more efficient conversion of heat to energy production.

As also described above, the present system is designed to exploit other sources of heat in the conversion process. Thus, coolant from grates 300 is used to preheat the boiler systems and increase the overall efficiency of the system.

Monitor and control 160 systems also communicate with sensors and controllers in the energy extraction 130 systems. For example, temperatures, pressures, and gas constituents may be measured and control signals given to adjust dampers, fans, air injectors, or exhaust cleaning systems to responsively control system operation.

Figure 6:
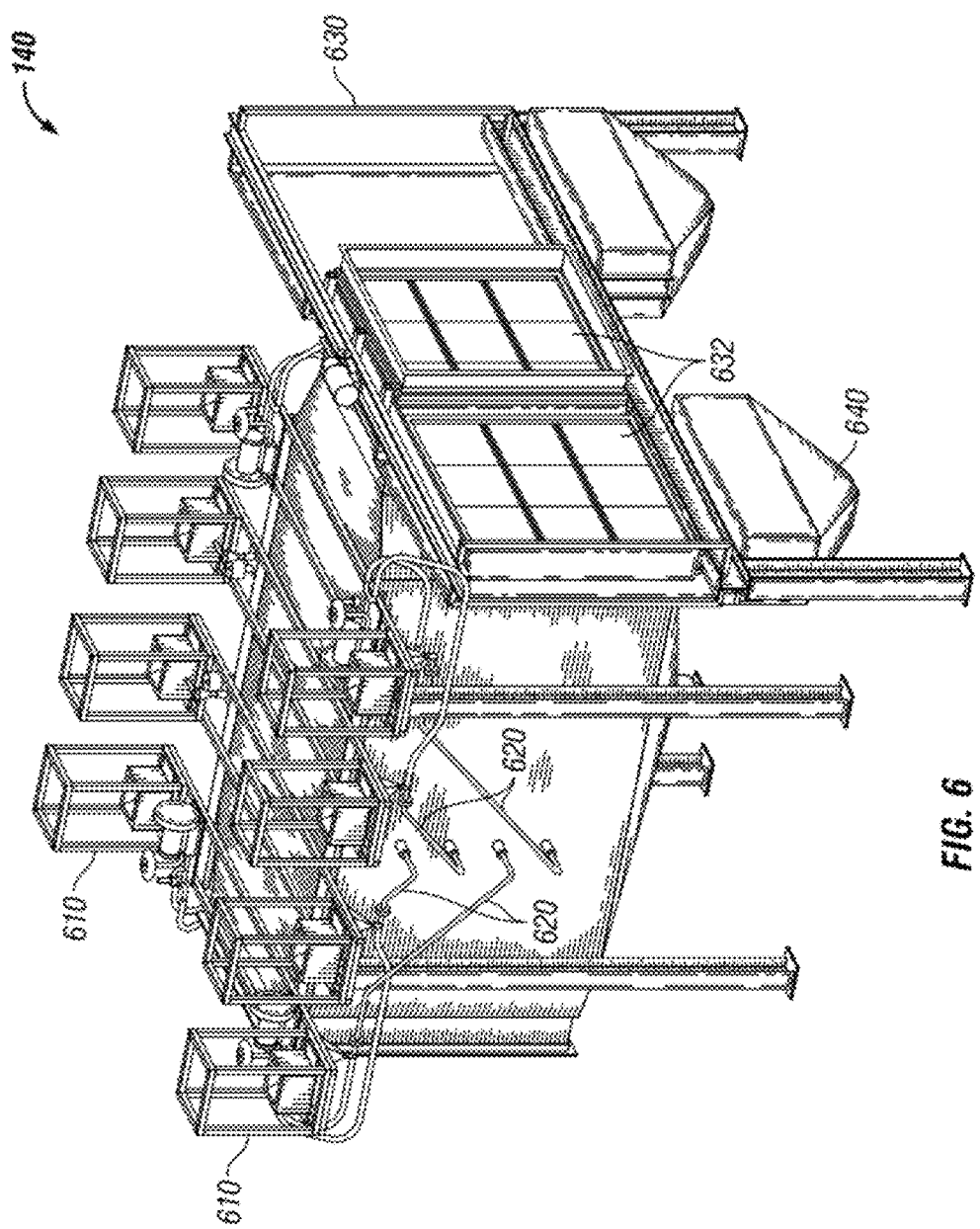
FIG. 6 is an illustration of some embodiments of exhaust cleaning systems. [needed]

FIG. 6 is an illustration of some embodiments of exhaust cleaning systems. As described above, after energy extraction 130, the gas stream, now substantially cooled, proceeds to exhaust treatment 140 systems. Any suitable exhaust treatments 140 may occur and will depend upon the type of waste 10 and any regulatory requirements for the exhaust 150. In some embodiments, and as shown in FIG. 6, exhaust treatment 140 includes lime (calcium oxide (CaO)) injection units 610 to remove hydrochloric acids (HCl) or sulfur dioxides ($SO_2$) from the exhaust 150. As shown, injection units 610 may comprise the appropriate receptacles for holding the lime (CaO) as well as the appropriate injection apparatus 620 to introduce the lime into the exhaust stream. In some embodiments carbon (C) may also be used to remove mercury (Hg) from the exhaust 150. Monitoring and control 160 is implemented to monitor the exhaust 150 constituents and characteristics, and control the operation of the various treatment systems in accordance with the monitored values.

FIG. 6 also provides an illustration of some additional exhaust cleaning systems in accordance with some embodiments. For example, mechanical filtration 630 can be performed to remove particulate matter from the exhaust stream. As shown, filters 632 may be provided to capture any remaining particulates in the exhaust stream. In some embodiments, filters 632 may comprise stainless steel filters that may be arranged to remove any remaining particulates from the exhaust 150. In some embodiments, it may be desirable to provide multiple filters 632 that are selectively positionable into the exhaust stream. It may also be desirable to provide catch basins 640 or other collectors to facilitate cleaning of the filters 632 and appropriate collection and disposal of any particulate residue. Other types of exhaust treatment 140 are also possible.

Figure 7:
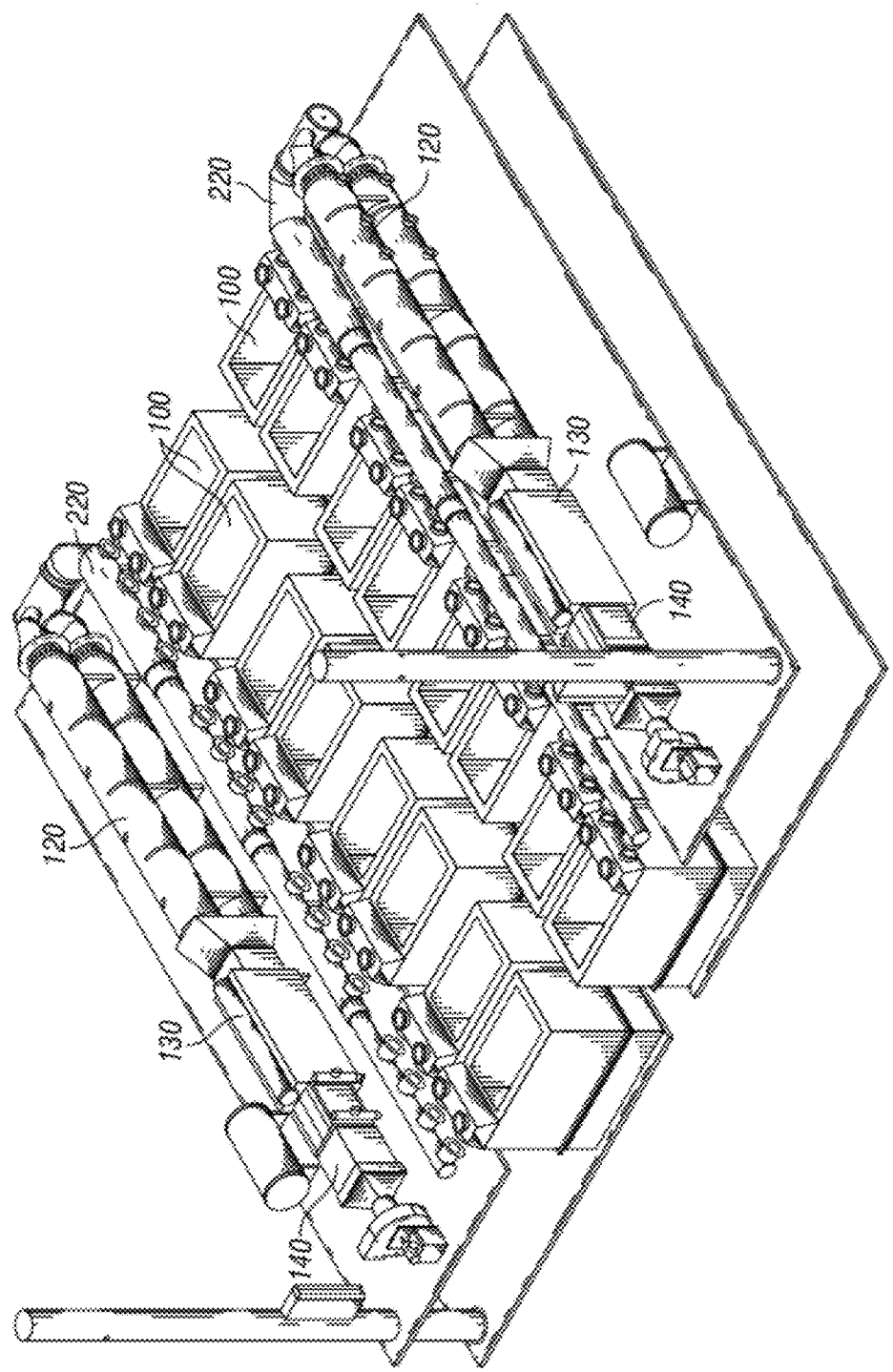
FIG. 7 is an illustration of embodiments implementing a plurality of primary chambers.

Having described various details of the present system, the following disclosure provides some description of system operation in a few diverse environments. The first example is that of fuel train operation, meaning operating several primary 100 systems to enable continuous, or near-continuous, operation of the waste-to-energy conversion system. FIG. 7 is an illustration of an embodiment implementing a plurality of primary chambers. As shown in FIG.

7 a plurality of primary 100 chambers are provided, each with one or more off gas ducts 220 that feed into a manifold or other ducting to direct the syn gas to secondary 120. In continuous, or near continuous operation, at least one primary 100 will be converting waste 10 to produce syn gas, while another may be cooling off from a recently completed conversion cycle, while still a third is being loaded with waste 10 and prepared for the start of a cycle, while another is being cleaned out of ash and other by products. In this fashion, the waste-to-energy conversion plant can supply continuous syn gas for the production of base load electricity or other usable energy as desired. An additional attribute of this fuel train operation is the ability to produce fluctuating levels of syn gas by increasing the amounts of syn gas produced during the oxidation process at various levels in order to structure the energy supply to meet the needs of peak and off-peak electricity demands or other energy supplies.

Figure 8A:
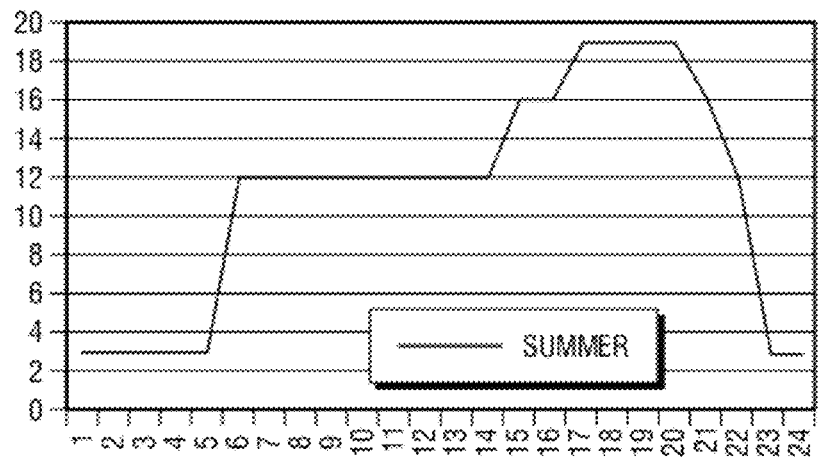
FIGS. 8A-8C are graphs representing power demand in accordance with some embodiments of the present system.
Figure 8B:
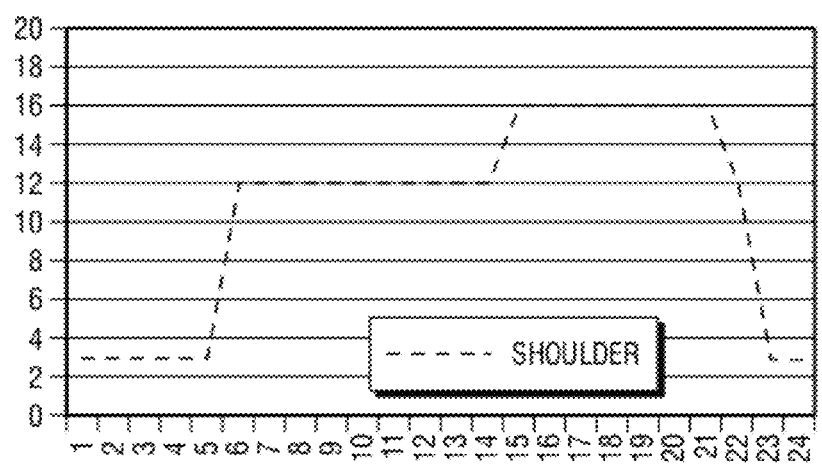
Figure 8C:
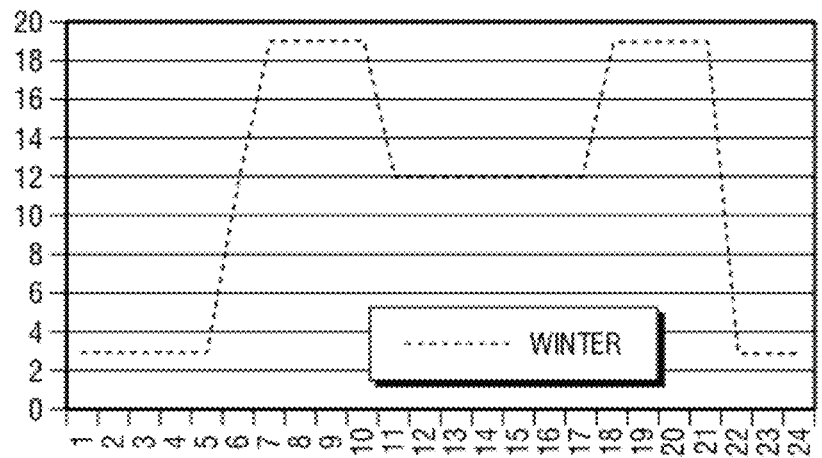

FIG. 7 also illustrates an embodiment where sixteen primary 100 chambers feed into one or the other of two over-under secondary chambers 120. Such an arrangement provides additional redundancies and output capacity to handle a wider swing in electricity demand, or to accommodate additional waste conversion needs. FIG. 8A-8C are graphs representing power demand and gas flow respectively in accordance with some embodiments of the present system. As shown in FIG. 8A-8C the electric power demand for a given locality may vary from about 3 MW to 19 MW during a 24 hour period. The fluctuation in demand will also vary depending upon the season (e.g., 8A shows summer demand, 8C shows winter demand, and 8B shows demand in the "shoulder" seasons between summer and winter (roughly, fall and spring depending upon the locale).

In accordance with some embodiments, the system may be operated such that one of the primary 100 chambers (e.g., chamber 1) begins production of syn gas at time T1. Through use of monitoring and control systems 160, the syn gas flow is monitored until it is observed at time T2 that syn gas production has leveled off. At time T3, relatively coincident with time T2, a second primary 100 chamber (e.g., chamber 2) begins production of syn gas. At time T4 chamber 2 had leveled off in production of syn gas and at time T5 chamber 1 is sufficiently finished and cooled to undergo cleaning of ash and residue. Also at time T5 a third primary chamber (chamber 3) initiates production of syn gas. Likewise, at time T6 chamber 3 levels off in production of syn gas and at time T7 chamber 2 is sufficiently finished and cooled to undergo cleaning of ash and residue. Also at time T7 a fourth chamber (chamber 4) initiates production of syn gas. At time T8 chamber 3 is sufficiently cooled and finished to undergo cleaning of ash and residue. In addition, at T8 chamber 1 may be re-loaded with additional waste 10 and the cycle may repeat. Realtedly, the process may be extended to eight or more primary chambers 100. In this, or similar, manner the production of syn gas, and related electrical energy, may be maintained at a relatively consistent level.

Figure 9B:
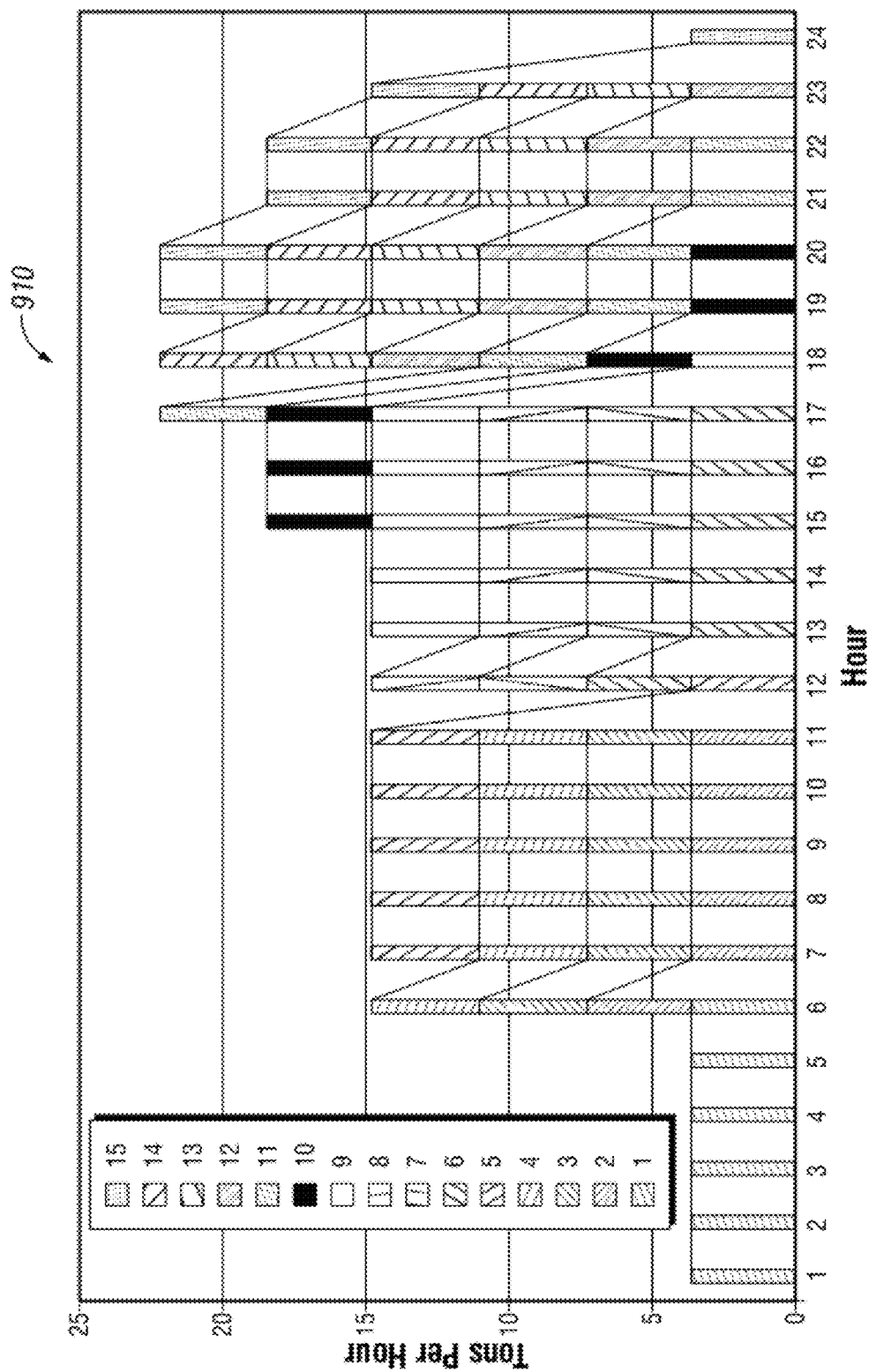

FIGS. 9A-9B show an example of fuel train operation according to some embodiments of the present system. As shown in data chart 900 (FIG. 9A), and plot 910 (FIG. 9B), during a 24 hour period, system operation starts with a first primary 100, out of fifteen primaries 100 in this example, loaded with waste 10. At hour 1, the power output is zero as syn gas has not yet been produced. Operation continues with the first primary operating alone for the first six hours of the period, the approximate cycle time for complete oxidation. Output rises up to the 3.7 Mega Watts (MW) level during those first six hours of operation. As demand is expected to rise, chambers two through four are loaded and operation initiated at hour six. Output increases up to 14.8 MW. Chamber 5 is loaded and the cycle initiated at hour 7, while chamber 1 goes off-line and can be cooled, emptied, and reloaded with waste 10. This keeps four chambers active through eleven hours of operation and keeps the output at 14.8 MW. At hour twelve, chambers six through eight are initiated, and two through four are brought off-line, again keeping four chambers operating and the output at 14.8 MW. At hour thirteen, chamber nine is initiated to replace chamber five, and so forth. As shown, output can be ramped up to 18.5 MW by having five chambers on-line, or 22.2 MW by having six chambers on-line. In this manner, the primary chambers 100 may be operated simultaneously, with two or more chambers 100 on-line at the same time, in order to produce the desired syn gas volume that corresponds with the increased power demand and required output power. Of course, other output values and numbers of operational chambers can be arranged to satisfy any number of anticipated demand curves.

Figure 10:
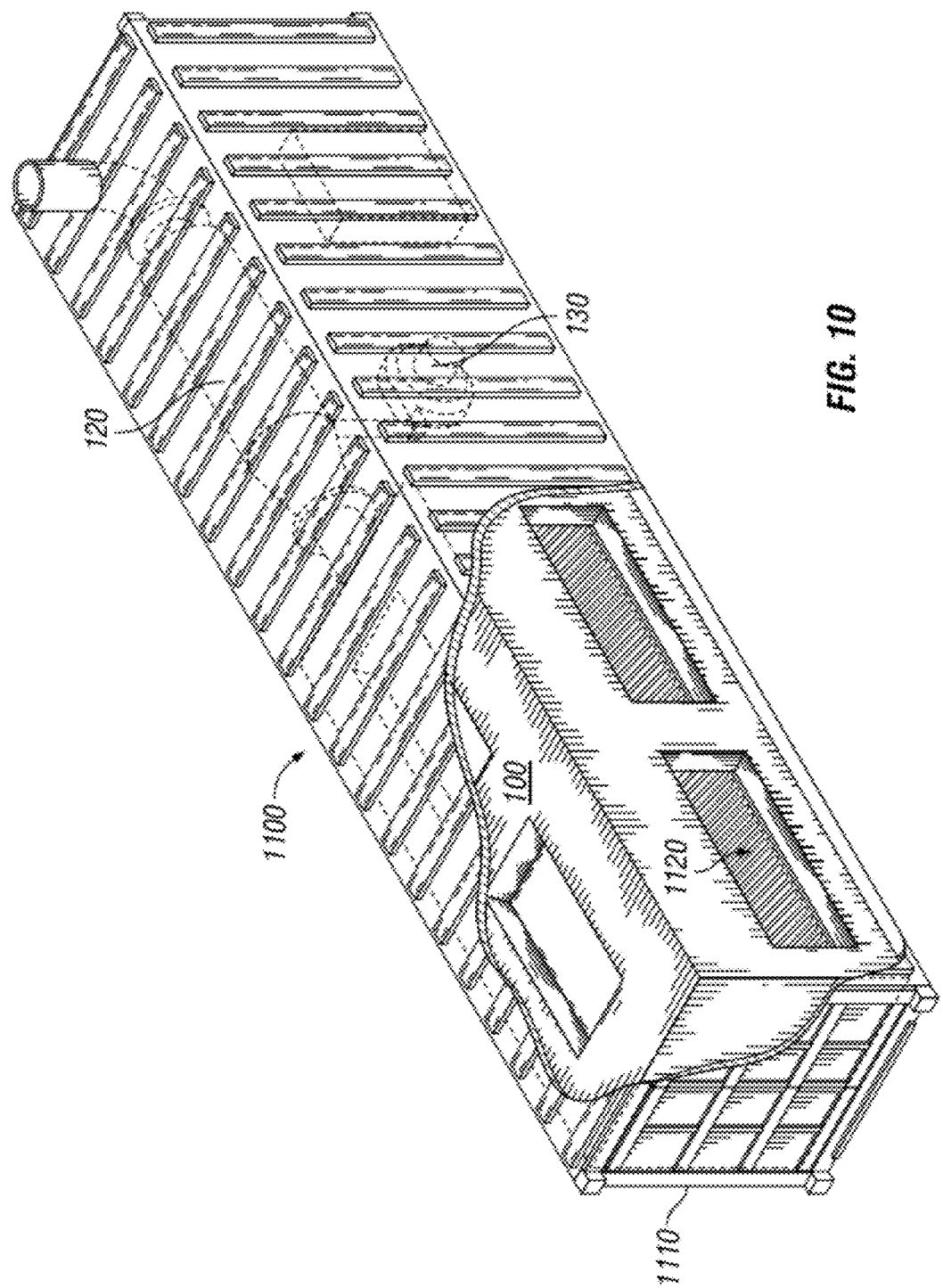
FIG. 10 is a schematic representation of a mobile waste-to-energy conversion unit in accordance with the present system.

Another embodiment of the present system enables remote operation of the waste-to-energy system. FIG. 10 is a schematic representation of a mobile waste-to-energy conversion unit in accordance with the present system. The mobile system 1100 comprises substantially the same components as the above-described systems and comprises at least a primary 100, secondary 120, and energy extraction 130 systems. The mobile system 1100 is sized to fit in a compact unit suitable for shipping or otherwise transporting to remote, and potentially difficult, regions. For example, mobile unit 1100 may be sized to fit within a standard sea-shipping container 1110. Sizing in such a standard container 1110 enables shipping of multiple units in a relatively efficient and cost-effective manner. Mobile systems 1100 may be deployed in remote locations, such as military posts, islands, or otherwise remote locations where any of waste disposal, power generation, or both would be desirable.

For some embodiments of the mobile systems 1100, certain adaptations may be desirable. For example, instead of using a liquid-cooled grate (e.g., grate 300), the mobile system 1100 may employ a slanted, air-cooled grate 1120. Other modifications are also possible.

Mobile systems 1100 may also be implemented in remote regions to heat water for purification or other purposes. For example, at a remote military base, mobile system may be implemented to heat water for general use, create steam for general use, as well as to dispose of waste generated at the base. Other implementations are also possible.

Figure 11:
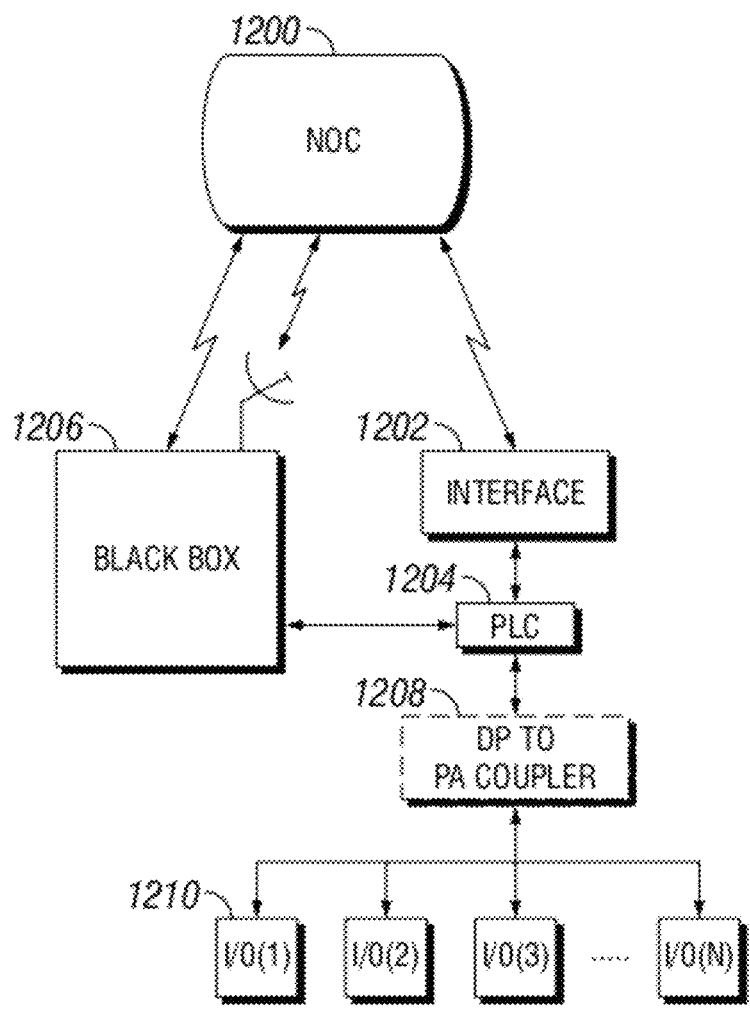
FIG. 11 is a schematic of one embodiment of the control systems in accordance with the present system.

Another important aspect of the present system is the ability to monitor and control the system. In particular, mobile systems 1100 may benefit from remote monitoring and control using the herein described systems. FIG. 11 is a schematic of one embodiment of the control systems in accordance with the present system. As shown, a network operations center (NOC) 1200 may be located remotely from the waste-to-energy system. NOC 1200 may include any appropriate hardware and software to enable communication over a computer or other communications network (e.g., the Internet, a cellular telephone network, or other communications network). For example, NOC 1200 may comprise digital computers, modems, or other network interfaces, or the like.

In some embodiments, NOC 1200 may communicate with additional digital computers, or some other processing interface 1202, running appropriate software to execute control and monitoring functionality. For example, the operating processing interface 1202 may comprise a Human-to-Machine Interface (HMI) running appropriate software, PC running PCS-7, or some other distributed control system software, or some other processor with an interface to allow input and output. Communication between NOC 1200 and interface 1202 may be accomplished in any suitable fashion. For example, communication may be accomplished via wireless communication, via wired communication, or via some other communication network. Likewise, communication may be accomplished according to any suitable protocol (e.g., TCP/IP or the like).

Interface 1202 may communicate with additional monitors and controllers throughout the system (e.g., monitor and control 160 systems). For example, in some embodiments, interface 1202 may communicate with a programmable logic controller (PLC) 1204. In some embodiments, PLC 1204 may comprise a S7 PLC made by Siemens, Corp., or the like. In some embodiments, it may be desirable to combine, or eliminate, the functions of interface 1202 and PLC 1204. For example, PLC 1204 may be implemented independently (i.e., in a stand-alone mode) or in conjunction with an interface 1202 (e.g., a Personal Computer, HMI, or the like) and vice versa.

In addition, for some embodiments, in particular remote, mobile embodiments, it may be desirable to enable communication between NOC 1200 and a "black box" control unit 1206 mounted on, or in direct communication with, the waste-to-energy system. Communication between NOC 1200 and black box controller 1206 may comprise redundant, but independent, communication paths, such as satellite and TCP/IP wireless communications. One advantage of such a set-up is to increase the likelihood of communication with a potentially remotely located unit. Black box controller 1206 is also in communication with PLC 1204 and can provide override control or terminate commands as necessary. In this manner, remote control of a system may be accomplished when local control is lost, or unadvisable.

In some embodiments, the black box controller 1206 may be a microcontroller based remote monitoring and control unit, which may comprise a microcontroller (or other processor-based device), data transmission device (satellite modem, cellular modem, TCP/IP, or the like), a data collection module, and a serial or other connection port. The black box controller 1206 may be implemented to monitor various I/O devices located on a field bus network for information, and then communicates that information to a designated recipient. The controller 1206 may also communicate directly with PLC 1204 to conduct pre-determined operations.

As illustrated in FIG. 11, PLC 1204 may optionally communicate via Distributed Peripherals-to-Process Automation (DP to PA) converter 1208 with any number of input/output (I/O) devices 1210, such as the numerous monitor and control 160 devices described herein. In embodiments where optional communication to converter 1208 is not used, direct communication between PLC 1204 and I/O devices 1210 may occur.

In some embodiments, a data collection module of controller 1206 may be connected to a Profibus Decentralized Peripheral ("DP") network. The Profibus DP may in turn be connected to a number of I/O devices 1210, whether directly on the DP bus or through a DP to PA coupler 1208.

For some embodiments, the PA coupler 1208 may comprise a two-wire network carrying digital information and power for the I/O devices 1210. The PA Coupler 1208 and DP bus allows, among other things, for the transmission of data at different rates, which is desirable in order to operate certain devices in an intrinsically safe environment, which also reduces the likelihood that the wires connected to the devices will generate enough energy to create ignition points to any environmental dangers such as surrounding volatile gases. For some embodiments, it may be possible to connect some I/O devices 1210 within the overall system directly to the DP bus, and not use the PA Coupler 1208.

The various I/O devices 1210 may be for collecting data and information consistent with the desired application for the desired remote monitoring and control. For example I/O devices 1210 may comprise data collection devices such as temperature sensors, pressure transmitters, and emission analyzers.

In some embodiments, the data collected by the data collection module is sent to the controller 1206, which then extracts the requested data. The data is then transmitted through the modem to the NOC 1200. In other embodiments, the data may by-pass the controller 1206 and go directly to transmission device, then out to the NOC 1200. In still other embodiments, the data collection module has another microcontroller in it that could be re-programmed to talk directly to a modem.

The black box controller 1206 may also be connected to the programmable logic controller (PLC) 1204 via the serial connection or other connection port. In some embodiments, this connection to the PLC 1204 will provide at least three functions. First, the black box controller 1206 will be able to directly shut down the PLC 1204 by sending a serial message informing it to shut down, which would inform it to stop processing and/or to open a relay to disconnect the power to the PLC 1204. Second, the PLC 1204 may be programmed to periodically "check in" with the Black Box 1206. In the event the black box 1206 is uncommunicative (i.e., gone or disabled), after a certain number of unresponsive "check ins" the PLC 1204 may be automatically shut down and cease operation of the system. Third, the Black Box 1206 will also identify operational errors generated within the PLC 1204.

Additionally, the Black Box 1206 may have pre-programmed alarms, which will monitor operating range limits of the various components in the system. For example, if in a waste-to-energy monitoring and control 160 application, a primary combustion chamber 100, or other monitored system component, gets above or below pre-set temperature setting, the Black Box 1206 may send a message to the NOC 1200 that the temperature had breached those set limits.

In some embodiments, for example, in the embodiment of FIG. 10, the Black Box 1206 may also provide GPS position of the system through a satellite modem. In the event a satellite modem is not utilized or the satellite modem does not support or provide GPS capabilities, a GPS module may be included within the Black Box 1206.

In some embodiments, monitor and control systems 160 may be implemented to protect the waste-to-energy conversion system from computer viruses, mal-ware, or other so called "cyber attacks." For example, suitable monitoring and virus protection software may be installed throughout the monitor and control systems 160 and, when used in conjunction with Black Box 1206, appropriate remediation can be remotely deployed.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. A waste-to-energy conversion apparatus comprising:
   a primary combustion chamber capable of holding a load of waste; and said primary combustion chamber further comprises:
   a heat source to heat loaded waste and generate a syn gas stream; air cooled grates, within said primary combustion chamber, capable of supporting said load of waste during heating;
   a mixing chamber wherein said syn gas is mixed with an additional combustion gas;
   a multi-chambered secondary combustion chamber, having independent and separate syn gas flow paths for each chamber, and for combusting the mixture of syn gas and additional combustion gas and comprising a gas manifold and an air manifold to respectively enable the introduction a supplemental combustion gas and air into the multi-chambered secondary combustion chamber, the supplemental combustion gas and air facilitating supplemental combustion of the mixture of syn gas and additional combustion gas; and
   an energy extraction system for extracting the heat energy generated by the combustion of the mixture of syn gas and additional combustion gas.

2. The apparatus of claim 1 wherein said primary combustion chamber further comprises a sealable door.

3. The apparatus of claim 1 wherein said load of waste is untreated waste.

4. The apparatus of claim 3 wherein said untreated waste comprises waste that is not sorted, or dried prior to loading into said primary combustion chamber.

5. The apparatus of claim 1 wherein said primary combustion chamber is capable of being operated at a partial vacuum of −0.1 atm to −0.3 atm.

6. The apparatus of claim 1 wherein said heat source further comprises a fossil fuel burner.

7. The apparatus of claim 1 wherein said heat source is located substantially in an area beneath the load of waste within said primary combustion chamber.

8. The apparatus of claim 1 wherein said heat source is located in an area of said primary combustion chamber so as to substantially reduce the turbulence in the syn gas stream generated by heating the load of waste.

9. The apparatus of claim 1 further comprising air injectors in fluid communication with said primary combustion chamber capable of injecting air into the load of waste as it is heated in said primary chamber.

10. The apparatus of claim 1 further comprising an ash removal door.

11. The apparatus of claim 10 further comprising a conveyor located substantially adjacent to said ash removal door and capable of conveying any ash residue resultant from heating said load of waste.

12. The apparatus of claim 11 wherein said conveyor further comprises a cart.

13. The apparatus of claim 11 wherein said conveyor further comprises a belt.

14. The apparatus of claim 1 wherein said mixing chamber further comprises a substantially ring shaped chamber.

15. The apparatus of claim 14 wherein said ring shaped chamber is constructed to induce turbulent flow of said mixture of syn gas and additional combustion gas.

16. The apparatus of claim 1 wherein said multi-chambered secondary combustion chamber further comprises dual chambers.

17. The apparatus of claim 16 wherein said dual chambers are arranged in an over-under configuration.

18. The apparatus of claim 1 wherein said multi-chambered secondary combustion chamber is configured to increase turbulence in the gas flowing therethrough.

19. The apparatus of claim 1 wherein said energy extraction system further comprises a boiler to transfer the heat energy due to combustion to a working fluid.

20. The apparatus of claim 1 wherein said energy extraction system further comprises an electricity generator for converting the heat energy into electric energy.

21. The apparatus of claim 1 wherein the energy extraction system further comprises a direct heat-to-electric energy converter.

22. The apparatus of claim 1 further comprising an exhaust treatment system.

23. The apparatus of claim 22 wherein the exhaust treatment system further comprises a calcium oxide injection system.

24. The apparatus of claim 22 wherein the exhaust treatment system further comprises mechanical filtering.

25. The apparatus of claim 1 further comprising an exhaust port.

26. The apparatus of claim 1 further comprising a monitor and control system.

27. The apparatus of claim 26 wherein said monitor and control system is capable of being communication with a location remote from said waste-to-energy conversion apparatus.

28. The apparatus of claim 1 wherein said primary combustion chamber comprises refractory material.

29. The apparatus of claim 1 wherein said primary combustion chamber is sized to enclose approximately 100 cubic yards in volume.

30. The apparatus of claim 1 wherein said primary combustion chamber further comprises a pressure relief valve.

31. The apparatus of claim 30 wherein said pressure relief valve is an automatically operating valve.

32. The apparatus of claim 1 wherein said primary combustion chamber further comprises a sprinkler system substantially within said primary combustion chamber to assist in the control of the waste conversion process.

33. A mobile waste-to-energy conversion unit comprising:
   a primary chamber;
   fluid cooled grates, within said primary chamber, capable of supporting said load of waste during heating;
   a mixing chamber wherein syn gas is mixed with an additional combustion gas;
   a multi-chambered secondary chamber, having independent and separate syn gas flow paths for each chamber, and for combusting the mixture of syn gas and additional combustion gas and comprising a gas manifold and an air manifold to respectively enable the introduction of the a supplemental combustion gas and air into the multi-chambered secondary combustion chamber, the supplemental combustion gas and air facilitating supplemental combustion of the mixture of syn gas and additional combustion gas; and
   energy extraction systems,
   wherein, the primary chamber, grates, mixing chamber, secondary chamber, and energy extraction systems are sized to fit within a shipping container.

34. The mobile unit of claim 33 wherein the shipping container is a standard sea-shipping container.

35. The mobile unit of claim 33 wherein the multi-chambered secondary combustion chamber is configured in a substantially over-under configuration.

36. The mobile unit of claim 33 wherein the fluid cooled grates further comprise air cooled grates.

37. The mobile unit of claim 33 wherein the mixing chamber further comprises a substantially ring-shaped outer duct to enable flow of additional combustion gas therethrough; an injection port in fluid communication with the outer duct to enable flow of the additional combustion gas to an inner duct portion and wherein said inner duct portion enables flow of syn gas therethrough; and wherein flow of additional combustion gas through said injection port induces turbulent flow in said syn gas.

38. A mobile waste-to-energy conversion unit comprising:
- a primary chamber;
- air cooled grates, within said primary chamber, capable of supporting said load of waste during heating;
- a mixing chamber wherein syn gas is mixed with an additional combustion gas;
- a multi-chambered secondary chamber, having independent and separate syn gas flow paths for each chamber, and for combusting the mixture of syn gas and additional combustion gas and comprising a gas manifold and an air manifold to respectively enable the introduction of the a supplemental combustion gas and air into the multi-chambered secondary combustion chamber, the supplemental combustion gas and air facilitating supplemental combustion of the mixture of syn gas and additional combustion gas; and
- energy extraction systems,
- wherein, the primary chamber, grates, mixing chamber, secondary chamber, and energy extraction systems are sized to fit within a shipping container.

39. The mobile unit of claim 38 wherein the shipping container is a standard sea-shipping container.

40. The mobile unit of claim 38 wherein the multi-chambered secondary combustion chamber is configured in a substantially over-under configuration.

41. The mobile unit of claim 38 wherein the mixing chamber further comprises a substantially ring-shaped outer duct to enable flow of additional combustion gas therethrough; an injection port in fluid communication with the outer duct to enable flow of the additional combustion gas to an inner duct portion and wherein said inner duct portion enables flow of syn gas therethrough; and wherein flow of additional combustion gas through said injection port induces turbulent flow in said syn gas.

* * * * *